United States Patent
Yamura

(10) Patent No.: US 9,729,805 B2
(45) Date of Patent: Aug. 8, 2017

(54) IMAGING DEVICE AND DEFECTIVE PIXEL CORRECTION METHOD

(71) Applicant: FUJIFILM Corporation, Tokyo (JP)

(72) Inventor: Hidehiko Yamura, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 385 days.

(21) Appl. No.: 14/011,084

(22) Filed: Aug. 27, 2013

(65) Prior Publication Data

US 2014/0063297 A1    Mar. 6, 2014

Related U.S. Application Data

(63) Continuation of application No. PCT/JP2011/075736, filed on Nov. 8, 2011.

(30) Foreign Application Priority Data

Feb. 28, 2011   (JP) .................................. 2011-043392

(51) Int. Cl.
- *H04N 5/367* (2011.01)
- *H04N 9/04* (2006.01)
- *H04N 5/365* (2011.01)

(52) U.S. Cl.
CPC ............. *H04N 5/367* (2013.01); *H04N 5/365* (2013.01); *H04N 9/045* (2013.01)

(58) Field of Classification Search
CPC .............................. H04N 5/365; H04N 5/367
USPC ......................................................... 348/242
See application file for complete search history.

(56) References Cited

U.S. PATENT DOCUMENTS

| | | | | |
|---|---|---|---|---|
| 2004/0032516 A1* | 2/2004 | Kakarala | ............... | G06T 3/4015 348/246 |
| 2005/0219390 A1* | 10/2005 | Tajima | ................... | H04N 9/045 348/246 |
| 2006/0238629 A1 | 10/2006 | Sato et al. | | |
| 2007/0285526 A1* | 12/2007 | Mann | ................. | H04N 5/23245 348/222.1 |
| 2008/0278609 A1* | 11/2008 | Otsuki | ................. | H04N 5/2178 348/247 |

(Continued)

FOREIGN PATENT DOCUMENTS

| | | |
|---|---|---|
| CN | 101304484 A | 11/2008 |
| JP | 7-336605 A | 12/1995 |

(Continued)

OTHER PUBLICATIONS

International Preliminary Report on Patentability dated Sep. 6, 2013 in PCT/JP2011/075736 (Form PCT/IPEA/409).

(Continued)

*Primary Examiner* — Antoinette Spinks
(74) *Attorney, Agent, or Firm* — Birch, Stewart, Kolasch & Birch, LLP

(57) ABSTRACT

Provided is an imaging device and a defective pixel correction method which can improve the accuracy of a defective pixel correction. In a case where a correction target pixel is a G pixel, a defective pixel correction unit determines whether there is an edge portion around the G pixel; when there is an edge portion, the defective pixel correction unit performs a defect correction by using G pixels adjacent to the G pixel in a X shaped direction; when there is no edge portion, it performs the defect correction using G pixels adjacent to the G pixel in the cross direction.

17 Claims, 13 Drawing Sheets

(56) References Cited

U.S. PATENT DOCUMENTS

2010/0026862 A1* 2/2010 Nishiwaki ............. H04N 9/045
                                                             348/246
2011/0001853 A1   1/2011 Sato et al.
2012/0092539 A1   4/2012 Katagiri et al.

FOREIGN PATENT DOCUMENTS

| JP | 2006-304231 A |     | 11/2006 |
|----|---------------|-----|---------|
| JP | 2007282109 A | * | 10/2007 |
| JP | 2008-278324 A | | 11/2008 |
| JP | 2010-68329 A | | 3/2010 |
| JP | 2010-166236 A | | 7/2010 |
| JP | 2011-15157 A | | 1/2011 |
| JP | 2011-24246 A | | 2/2011 |

OTHER PUBLICATIONS

Notification of Transmittal of Translation of International Preliminary Report on Patentability in PCT/JP2011/075736 (Form PCT/IB/338).
International Search Report for PCT/JP2011/075736 dated Dec. 6, 2011.
Chinese Office Action, issued Mar. 24, 2016, for Chinese Application No. 201180068655.7, along with an English translation of the Chinese Office Action and Chinese Search Report.
Chinese Office Action, dated Nov. 15, 2016, for Chinese Application No. 201180068655.7, with an English translation.
Chinese Office Action, dated Mar. 2, 2017, for Chinese Application No. 201180068655.7, with an English translation.
Japanese Office Action dated Oct. 21, 2014, issued in corresponding Japanese Patent Application No. 2013-502146.

\* cited by examiner

FIG.3A

| Gr | R | Gr | R | Gr |
|----|---|----|---|----|
| B | Gb | B | Gb | B |
| Gr | R | (Gr) | R | Gr |
| B | Gb | B | Gb | B |
| Gr | R | Gr | R | Gr |

X-SHAPED CORRECTION PROCESSING

FIG.3B

| Gr | R | Gr | R | Gr |
|----|---|----|---|----|
| B | Gb | B | Gb | B |
| Gr | R | (Gr) | R | Gr |
| B | Gb | B | Gb | B |
| Gr | R | Gr | R | Gr |

CROSS CORRECTION PROCESSING

FIG.4A

| Gr | R  | Gr | R  | Gr |
|----|----|----|----|----|
| B  | Gb | B  | Gb | B  |
| Gr | R  | Gr | R  | Gr |
| B  | Gb | B  | Gb | B  |
| Gr | R  | Gr | R  | Gr |

FIG.4B

| Gr | R  | Gr | R  | Gr |
|----|----|----|----|----|
| B  | Gb | B  | Gb | B  |
| Gr | R  | Gr | R  | Gr |
| B  | Gb | B  | Gb | B  |
| Gr | R  | Gr | R  | Gr |

FIG.4C

| Gr | R  | Gr | R  | Gr |
|----|----|----|----|----|
| B  | Gb | B  | Gb | B  |
| Gr | R  | Gr | R  | Gr |
| B  | Gb | B  | Gb | B  |
| Gr | R  | Gr | R  | Gr |

FIG.4D

| Gr | R  | Gr | R  | Gr |
|----|----|----|----|----|
| B  | Gb | B  | Gb | B  |
| Gr | R  | Gr | R  | Gr |
| B  | Gb | B  | Gb | B  |
| Gr | R  | Gr | R  | Gr |

*FIG.13*

| R | Gr | R | Gr | R | Gr | R | Gr |
|---|---|---|---|---|---|---|---|
| Gb | B | Gb | B | Gb | B | Gb | B |
| R | Gr | R | Gr | R | Gr | R | Gr |
| Gb | B | Gb | B | Gb | B | Gb | B |
| R | Gr | R | Gr | R | Gr | R | Gr |
| Gb | B | Gb | B | Gb | B | Gb | B |
| R | Gr | R | Gr | R | Gr | R | Gr |
| Gb | B | Gb | B | Gb | B | Gb | B |

IMAGING DEVICE AND DEFECTIVE PIXEL CORRECTION METHOD

CROSS-REFERENCE TO RELATED APPLICATIONS

This is a continuation of International Application No. PCT/JP2011/075736 filed on Nov. 8, 2011, and claims priority from Japanese Patent Application No.: 2011-043392 filed on Feb. 28, 2011, the entire disclosures of which are incorporated herein by reference.

TECHNICAL FIELD

The present invention relates to an imaging device and a defective pixel correction method.

BACKGROUND ART

In recent years, solid-state imaging devices have been progressing toward a great number of pixels and a narrow pixel pitch, and color mixture or pixel defect that may accordingly occur has a big effect on an image quality.

Defective pixel corrections are generally performed by replacing a signal obtained from a defective pixel with a mean value of signals obtained from the pixels which have the same color as the defective pixel, located around the defective pixel. However, according to the progress in realizing the number of pixels and the narrow pixel pitch, such a general correction method may cause a scar of the correction to be conspicuous. This reason will be described in the following.

FIG. 13 is a diagram showing a pixel arrangement of a solid-state imaging element equipped with a color filter with Bayer pattern. In FIG. 13, the blocks marked with "R" denote R pixels for detecting red light, the blocks marked with "B" denote B pixels for detecting blue light, the blocks marked with "Gr" denote that there are R pixels at left and right sides thereof among G pixels detecting green light, and the blocks marked with "GB" denote that there are B pixels at left and right sides thereof among G pixels detecting green light.

As shown in FIG. 13, in the solid-state imaging element equipped with the color filter of Bayer pattern, the solid-state imaging element includes three types of R pixel, G pixel, and B pixel. The G pixel among the three types of pixels may be divided into two kinds of attributes (Gr pixel, Gb pixel) around which R pixel and B pixel are differently arranged.

Since the Gb pixel and Gr pixel each have a different arrangement of R pixel and B pixel at its adjacent periphery, a difference between a signal level of the Gr pixel and a signal level of the Gb pixel is generated by color mixture depending on the incidence direction of incident light. The larger the incidence angle of light to the solid-state imaging element is like light causing a ghost signal level and the closer to monochromatic light the incident light becomes like red light, the more prominent the difference in the signal level becomes.

Thus, for example, in the case where there is a defective pixel at a position of a Gr pixel (or Gb pixel), if the defective pixel is corrected using four Gb pixels (Gr pixel) which are adjacent to the defective pixel in a X shaped direction (located at an obliquely upper right side, obliquely lower right side, obliquely upper left side, and obliquely lower left side of the defective pixel), since corrections are performed using an output signal of the Gb pixel (Gr pixel) having a different level, it is difficult to have an output level of the defective pixel closer to an original level.

Therefore, it may consider that the defective pixel located at a position of Gb pixel (or Bb pixel) is corrected by using the four Gr pixels (Gb pixels) which are adjacent to the defective pixel in the cross direction thereof (adjacent at the upper and lower, and right and left sides of the defective pixel). However, in this correction method, since the corrections are performed using a signal of a pixel located far from the defective pixel as compared to the method of performing the correction using the four pixels adjacent to the defective pixel in the X-shaped direction, in a high-frequency image, it is difficult to have the output level of the defective pixel close to the original level thereof.

A method of correcting a signal of defective pixel by using signals of pixels surrounding the pixel is disclosed, for example, in the following Patent Documents 1 to 3.

Patent Document 1 discloses a correction method of a defective pixel in a solid-state imaging device equipped with a color filter having Bayer pattern, and the correction method is performed by selecting any one of a first correction processing for performing corrections using output signals of pixels having the same color as the corresponding defective pixel which are adjacent to the defective pixel in a cross direction thereof and a second correction processing for performing corrections using output signals pixels having the same color as the corresponding defective pixel that are adjacent to the defective pixel in a X-shaped direction thereof, based on the correlation between the output signal of the corresponding defective pixel and the output signals of the same colored pixels that are adjacent to the corresponding defective pixel.

Patent Document 2 discloses a method of correcting an output signal of a corresponding target pixel using output signals of the same color pixels that are adjacent to the correction target pixel in the cross direction of the correction target pixel.

Patent Document 3 discloses a method of correcting an output signal of a correction target pixel by using output signals of eight pixels adjacent to the correction target pixel Patent Document 1: Japanese Patent Application Publication No. 2010-068329A Patent Document 2: Japanese Patent Application Publication No. 2011-015157A Patent Document 3: Japanese Patent Application Publication No. H07-336605A Since the device described in Patent Document 1 is intended to select a correction method based on the correlation between the output signal of the defective pixel and the output signals of the pixels surrounding the defective pixel, there may be a case where the second correction processing is performed even for the high-frequency image, in this case, a scar of the correction to the high-frequency image is conspicuous.

The device described in Patent Document 2 is intended to perform only the processing for correcting the output signal of the corresponding correction target pixel using the output signals of the same color pixels that are adjacent to the correction target pixel in the cross direction of the correction target pixel, it is impossible to solve the problem that a scar of the correction to the high-frequency image is conspicuous.

Like the solid-state imaging device shown in FIG. 13, in the case where the correction method described in Patent Document 3 is applied to the solid-state imaging element having a plurality of types of same-color pixels (Gr pixel, Gb pixel) around which pixels are arrayed differently, correction data are generated using the signals of different colors and a scar of the correction is thereby conspicuous after the correction of the defective pixel.

The present invention has been made in an effort to solve the problems, and an object of the present invention is to provide an imaging device and a defective pixel correction method capable of improving the accuracy of a defective pixel correction.

SUMMARY

An imaging device according to the present invention includes a solid-state imaging element for color imaging that has at least a first pixel group including at least three types of pixels that are two-dimensionally arranged and different from each other in a detection wavelength range; and a defective pixel correction unit that performs a defective pixel correction to a captured image signal output from the solid-state imaging element, wherein one type of pixels out of the at least three types of pixels is divided into two kinds of attributes of pixels around which arrangements of pixels that are arranged at the periphery of the corresponding pixels and different in its type from the corresponding pixels are different from each other; in a case where a correction target pixel is any one of the two kinds of attributes of pixels, the defective pixel correction unit determines whether an edge portion of a subject is put on a pixel area which is centered on the correction target pixel and includes pixels of the same attribute and the same type as the correction target pixel, when it is determined that the edge portion is put on the pixels, it performs a first correction processing, and when it is determined that the edge portion is not put on the pixels, it performs a second correction processing; the first correction processing is a processing for correcting an output signal of the corresponding correction target pixel using output signals of the pixels in the first pixel group, which are of the different attribute while being of the same type as the corresponding correction target pixel and adjacent to the correction target pixel; and the second correction processing is a processing for correcting an output signal of the corresponding correction target pixel using output signals of the pixels in the first pixel group, which are of the same attribute while being of the same type as the corresponding correction target pixel and adjacent to the correction target pixel.

A defective pixel correction method of performing a defective pixel correction to a captured image signal output from a solid-state imaging element for color imaging that comprises at least a first pixel group comprising at least three types of pixels that are two-dimensionally arranged and different from each other in a detection wavelength range, wherein one type of pixels out of the at least three types of pixels is divided into two kinds of attributes of pixels around which arrangements of pixels that are arranged at the periphery of the corresponding pixels and different its type from the corresponding pixels are different from each other, the method comprises: an edge determination step of determining whether or not an edge portion of a subject is put on pixels of the first pixel group adjacent to a correction target pixel when the correction target pixel is any one of the two kinds of attributes of pixels; and a correction processing step of performing a first correction processing when it is determined that the edge portion is put on the pixels, and performing a second correction processing when it is determined that the edge portion is not put on the pixels, wherein the first correction processing is a processing for correcting an output signal of a corresponding correction target pixel using output signals of the pixels in the first pixel group, which are of the different attribute while being of the same type as the corresponding correction target pixel and adjacent to the correction target pixel, and the second correction processing is a processing for correcting an output signal of a corresponding correction target pixel by using output signals of the pixels in the first pixel group, which are of the same attribute while being of the same type as the corresponding correction target pixel and adjacent to the correction target pixel.

According to the present invention, it is possible to provide an imaging device and a defective pixel correction method which can improve the accuracy of defective pixel correction.

BRIEF DESCRIPTION OF DRAWINGS

FIGS. 3A and 3B are diagrams illustrating a first correction processing and a second correction processing that a defective pixel correction unit 19 executes in the digital camera shown in FIG. 1.

FIGS. 4A, 4B, 4C and 4D are diagrams illustrating an example of an edge determination processing that the defective pixel correction unit 19 executes in the digital camera shown in FIG. 1.

FIG. 13 is a view illustrating a pixel array of the solid-state imaging element equipped with a color filter with Bayer pattern.

DETAILED DESCRIPTION

Hereinafter, embodiments of the present invention will be described with reference to the accompanying drawings.

Figure 1:
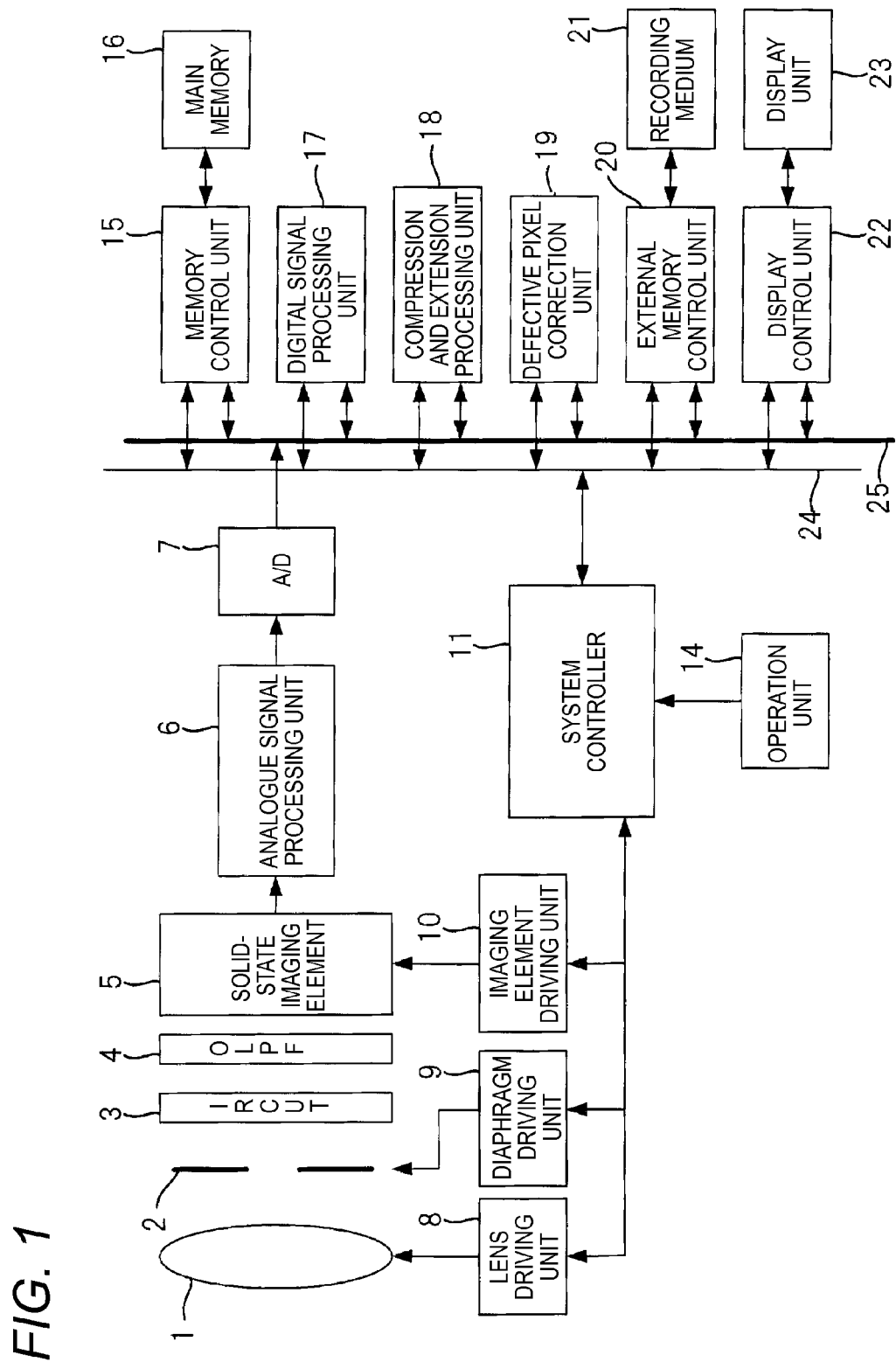
FIG. 1 is a schematic diagram showing a configuration of an imaging device according to an embodiment of the present invention.

FIG. 1 is a diagram showing a schematic configuration of an imaging device according to one embodiment of the present invention. As an imaging device, there are an imaging device such as a digital video camera and a digital camera, an imaging module that is mounted in a mobile phone with a camera, an electronic endoscope, and the like. Here, the digital camera will be described as an example.

An imaging system of s digital camera shown in FIG. 1 includes a photographing lens 1 including a focus lens, a zoom lens and the like, a solid-state imaging element 5 for color imaging that is an image sensor of a MOS type or a CCD type, a diaphragm 2 which is provided there-between, an infrared cut filter 3, and an optical low-pass filter 4.

A system controller 11 for overall control of an electric control system of the digital camera serves to control a lens driving unit 8 to thereby control the position of the focus lens of the photographing lens 1 or the position of the zoom lens, or serves to control the amount opening of the diaphragm 2 via the diaphragm driving unit 9 to thereby adjust the exposure amount.

Further, the system controller 11 serves to drive the solid-state imaging element 5 via an imaging element driving unit 10, and to output, as a captured image signal, a subject image captured through the photographing lens 1. An instruction signal from a user is input to the system controller 11 through an operation unit 14.

In addition, the electric control system of the digital camera is provided with an analog signal processing unit 6 connected to an output of the solid-state imaging element 5 to execute an analog signal processing such as a correlated double sampling processing or the like, and an A/D converting circuit 7 that converts a captured image signal outputted from the analog signal processing unit 6 to a digital signal, which are controlled by the system controller 11.

Further, the electric control system of the digital camera includes a main memory 16; a memory control unit 15 connected to the main memory 16; a digital signal processing unit 17 that executes gamma correction operation, RGB/YC conversion processing and the like with respect to the captured image signal outputted from the A/D converting circuit 7 to thereby generate captured image data; an compression and extension processing unit 18 that compresses the captured image data generated from the digital signal processing unit 17 in a JPEG format or extends the compressed image data; a defective pixel correction unit 19 that performs a defective pixel correction with respect to the capture image signal outputted from the A/D converting circuit 7, which will be described later; an external memory control unit 20 connected to a detachable recording medium 21; and a display control unit 22 connected to a liquid crystal display unit 23 mounted on the rear of the camera or the like. The memory control unit 15, the digital signal processing unit 17, the compression and extension processing unit 18, the defective pixel correction unit 19, the external memory control unit 20 and the display control unit 22 are interconnected by a control bus 24 and a data bus 25 and controlled by a command from the system control unit 11.

Figure 2:
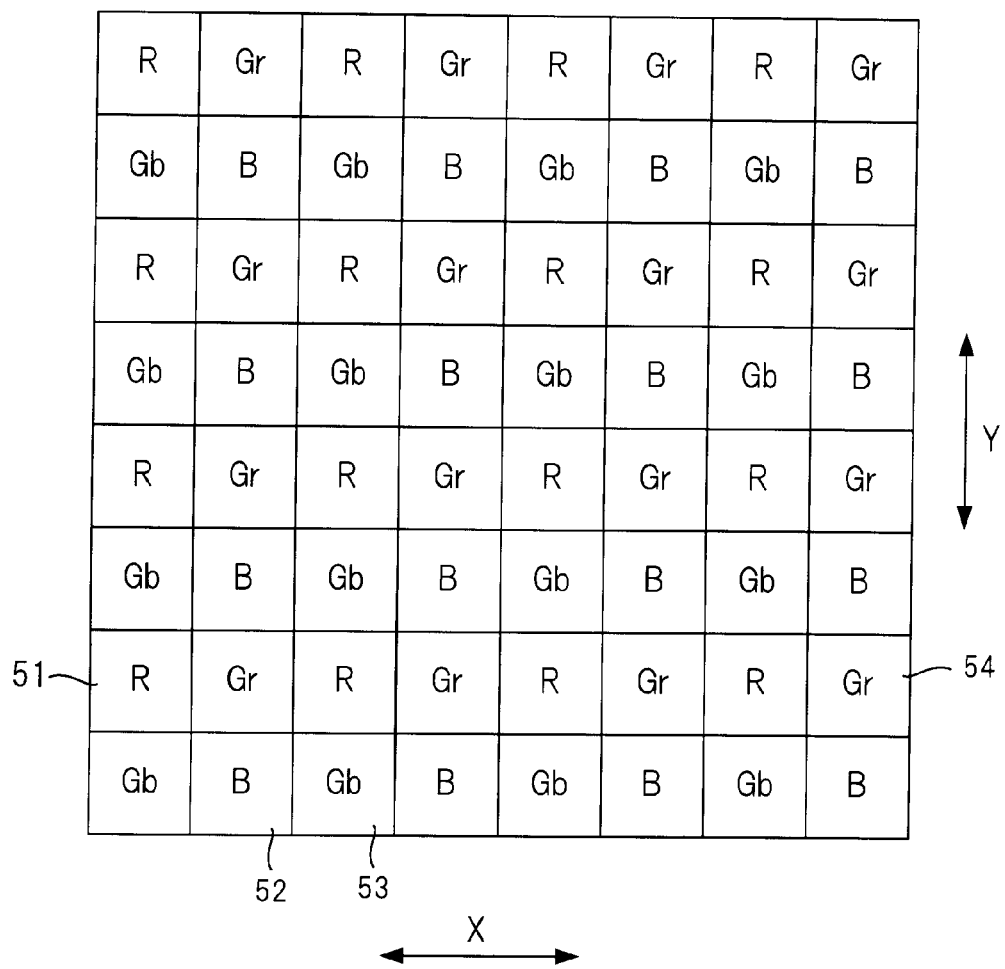
FIG. 2 is a plan diagram showing a configuration of a solid-state imaging element 5 in a digital camera shown in FIG. 1.

FIG. 2 is a schematic plan view showing a configuration of the solid-state imaging element 5 in the digital camera shown in FIG. 1.

The solid-state imaging element 5 is provided with a plurality of pixels 51, 52, 53, 54 arranged in a two-dimensional shape in a row direction X and a column direction perpendicular to the row direction X (in a square lattice shape in the example of FIG. 2). Each pixel included in the solid-state imaging element 5 includes a photoelectric conversion element such as a photodiode, and a color filter provided above the photoelectric conversion element.

The plurality of pixels includes three kinds of pixels each having a different-wavelength detecting region, i.e., R pixel 51 detecting red light (marked with "R" in FIG. 2), B pixel 52 detecting blue light (marked with "B" in FIG. 2), and G pixel 53, 54 detecting green light (marked with "Gr, Gb" in FIG. 2). These three kinds of pixels are arranged in a Bayer pattern.

The G pixels 53, 54 are arranged in a checkered position among the plurality of pixels arranged in a square grid shape, the R pixels 51 are arranged in the odd rows in the other checkered position, and the B pixels 52 are arranged in the even rows. In other words, the plurality of pixels are arranged in such a manner that the rows where the R pixels 51 and G pixels 54 are arranged alternately in the row direction X and the rows where the G pixels 53 and B pixels 52 are arranged alternately in the row direction X are arranged alternately in the column direction Y. Further, the plurality of pixels shown in FIG. 2 is formed, as a unit pixel, with the four pixels (R pixel 51, B pixel 52, G pixels 53, 54) arranged at the corner of the upper left side, in which the unit pixels are arranged in a square lattice pattern.

As shown in FIG. 2, the G pixel for detecting green light is classified into two kinds of attributes of pixels (G pixel 53, G pixel 54), each of which has a different arrangement of R pixel 51 and B pixel 53 at the periphery of the corresponding G pixel and is a different type of pixel from the corresponding G pixel.

Hereinafter, the G pixel 53 having B pixels 52 at left and right sides thereof is referred to as Gb pixel 53, and the G pixel 54 having R pixels 51 at left and right sides thereof is referred to as Gr pixel 54. In FIG. 2, the Gb pixel 53 is marked with "Gb" and the Gr pixel 53 is marked with "Gr".

The Gb pixel 53 and the Gr pixel 54 each have the different arrangement of the R pixel 51 and B pixel 52 at each periphery thereof. Therefore, when light is obliquely incident on the solid-state imaging element 5, a level difference, which is caused by color mixture depending on the incident direction of the incident light, occurs between the output signal of the Gb pixel 53 and the output signal of the Gr pixel 54.

Next, the function of the defective pixel correction unit 19 in the digital camera shown in FIG. 1 will be described.

The defective pixel correction unit 19 performs a defective pixel correction to captured image signals (a group of output signals of each of the pixels included in the solid-state imaging element 5) that are temporarily stored in the main memory 16 and outputted from the solid-state imaging element 5. The defective pixel correction refers to a processing of correcting a signal outputted from a defective pixel out of all pixels included in the solid-state imaging element 5 by using signals outputted from the pixels which correspond to the same type of pixel as the corresponding defective pixel and positioned at the periphery of the corresponding defective pixel.

Address information of the defective pixel of the solid-state imaging element 5 and information indicating the type (detected color) of the corresponding defective pixel are stored in the main memory 16 of the digital camera at the time of shipment of the digital camera. Therefore, the defective pixel correction unit 19 is capable of identifying a pixel to be corrected (correction target pixel) using the information.

In addition, the address information of a defective pixel of the solid-state imaging element 5 and information indicating the type (detected color) of the corresponding defective pixel may be updated at any time if a defective pixel occurs after shipment of the digital camera. Accordingly, the defective pixel correction unit 19 is also able to correct the so-called subsequent scratch that occurs after shipment of the digital camera.

When the correction target pixel is a G pixel that corresponds to the pixel type that is classified into two kinds of attributes among the three types of pixels included in the solid-state imaging element 5, the defective pixel correction unit 19 executes selectively) one of the first correction processing and the second correction processing, thereby correcting the output signal of the corresponding G pixel.

The first correction processing refers to a processing in which an output signal of a correction target pixel among the output signals forming captured image signals stored in the main memory 16 is corrected using output signals of the pixels which are adjacent to the corresponding correction target pixel while being of the same kind of pixel as the corresponding correction target pixel, and at the same time belongs to a different attribute from the corresponding correction target pixel.

The second correction processing refers to a processing in which an output signal of a correction target pixel is corrected using output signals of the pixels which are adjacent to the corresponding correction target pixel while being of the same type of pixel as the corresponding correction target pixel, and at the same time, of the same attribute as the corresponding correction target pixel.

FIGS. 3A and 3B are diagrams illustrating the first correction processing and the second correction processing that are executed by the first defective pixel correction unit 19 in the digital camera shown in FIG. 1. FIG. 3A is a diagram illustrating the first correction processing and FIG. 3B is a diagram illustrating the second correction processing.

FIGS. 3A and 3B show a part (5 rows×5 columns) of the pixels of the solid-state imaging element 5 shown in FIG. 2 (reference numeral is omitted). Hereinafter, the Gr pixel (marked with the mark ◯) positioned in the middle among the 25 pixels shown in FIGS. 3A and 3B will be assumed as a correction target pixel.

In the first correction processing, the defective pixel correction unit 19 corrects an output signal of a subject Gr pixel, using output signals of the four Gb pixels (pixels hatched in FIG. 3A) adjacent to the Gr pixel of the correction target pixel in a X shaped direction (lower right, upper right, lower left and upper left of the corresponding Gr pixel). For example, the correction is performed by replacing the output signal of Gr pixel marked with ◯ mark with a mean value of the output signals of the four Gb pixels hatched. In the configuration of the solid-state imaging element shown in FIG. 2, since the first correction processing is performed using the pixels that are adjacent to the correction target pixel in a X-shaped direction and have the same color as the correction target pixel, in the following, the first correction processing may be called a X-character correction processing.

In the second correction processing, the defective pixel correction unit 19 corrects an output signal of the subject Gr pixel by using output signals of the four Gr pixels (pixels hatched in FIG. 3B) adjacent to the Gr pixel of the correction target pixel in a cross direction (upper and lower, and left and right of the corresponding Gr pixel). For example, the correction is performed by replacing the output signal of Gr pixel marked with the mark ◯ with a mean value of the output signals of the four Gb pixels hatched. In the configuration of the solid-state imaging element shown in FIG. 2, since the second correction processing is performed using the pixels that are adjacent to the correction target pixel in a cross direction and have the same color as the correction target pixel, in the following, the second correction processing may be called a cross correction processing.

When the G pixel is a correction target pixel, the X-character correction processing, as compared to the cross correction processing, executes a correction by using the output signals of the same color pixels positioned closely to the correction target pixel. Accordingly, a scar of the correction on a high-frequency image is less noticeable. However, since the correction is performed using output signals of the same color pixels (pixels each having a large difference in its output level) having a different attribute from the correction target pixel, the correction mark is conspicuous on the low-frequency image.

Meanwhile, the cross correction processing is to perform a correction using output signals of the same color pixels (pixels each having a low difference in its output level) of the same attribute as the correction target pixel. Accordingly, a scar of the correction to a low-frequency image is hardly noticeable. However, since the correction is performed using output signals of the same color pixels located far from the correction target pixel, a scar of the correction on a high-frequency image is conspicuous.

As such, if the G pixel in the solid-state imaging element 5 is a correction target pixel, the cross correction processing and the X character correction processing have merits and demerits, respectively. Therefore, in the case where the correction target pixel is a G pixel, the defective pixel correction unit 19 performs an edge determination processing to determine whether an edge portion of a subject is put on the pixels positioned at the periphery of the corresponding correction target pixel. When it is determined in the edge determination processing that the edge portion is put on the pixels, the first correction processing is performed (FIG. 3A). When it is determined in the edge determination processing that the edge portion is not put on the pixels, the second correction processing is performed (FIG. 3B).

Incidentally, in the case where the correction target pixel is the R pixel 51 or the B pixel 52, the defective pixel correction unit 19 corrects the output signal of the correction target pixel by using the output signals of the four R pixels 51 (B pixel 52) that is close to the R pixel 51 (B pixel 52) of the correction target pixel in the cross direction and that is the same type as the corresponding correction target pixel.

In the edge determination processing, for example, as shown in FIGS. 3A and 3B, the pixel area (edge determination region), which is to be determined as to whether the edge portion is put on, is determined on the region where the pixels of 5×5=25 pieces centered on the correction target pixel are positioned. If the cross correction process is to be performed, since it is necessary to use the four pixels of the same attribute and the same type adjacent to the correction target pixel, an area where the corresponding four pixels are included is determined as the edge determination area.

In the following, an example of edge determination processing will be described.

FIGS. 4A, 4B, 4C and 4D are diagrams illustrating an example of the edge determination processing. In FIGS. 4A to 4D, the pixel of 5 rows×5 columns centered on the Gr pixel to be corrected are shown (reference numeral is omitted).

As shown in FIG. 4A, the defective pixel correction unit 19 classifies the six R-pixels included in the 25 pixels centered on the correction target pixel into the two R-pixels (R pixel surrounded by mark Δ in the figure) positioned in the same row as the correction target pixel and the other 4 R-pixels (R pixel surrounded by mark ☐ in the figure), and calculates one evaluation value using the output signals of the 6 R-pixels.

Further, as shown in FIG. 4B, the defective pixel correction unit 19 classifies the six B-pixels included in the 25 pixels centered on the correction target pixel into the two B-pixels (B pixel surrounded by mark Δ in the figure) positioned in the same row as the correction target pixel and the other 4 B-pixels (B pixel surrounded by mark □ in the figure), and calculates one evaluation value using the output signals of the 6 B-pixels 52.

As shown in FIG. 4C, the defective pixel correction unit 19 classifies the six Gr-pixels which are positioned at the periphery of the correction target pixel and included in the 25 pixels centered on the correction target pixel into the two Gr-pixels (Gr pixel surrounded by mark Δ in the figure) positioned in the same row as the correction target pixel and the other 4 Gr-pixels (Gr pixel surrounded by mark □ in the figure), and calculates one evaluation value by using the output signals of the 6 Gr-pixels.

As shown in FIG. 4D, the defective pixel correction unit 19 classifies the six Gr-pixels that are adjacent to the correction target pixel and included in the 25 pixels centered on the correction target pixel into the two Gr-pixels (Gr pixel surrounded by mark Δ in the figure) positioned in the same column as the correction target pixel and the other 4 Gr-pixels (Gr pixel surrounded by mark □ in the figure), and calculates one evaluation value by using the output signals of the 6 Gr-pixels.

The defective pixel correction unit 19 calculates the evaluation value corresponding to each of the classifications shown in FIGS. 4A to 4D by the following equation (1) using the output signals of the pixels surrounded by the mark Δ (hereinafter referred to as Δ pixel signal) and the output signals of the pixels surrounded by the mark □ (hereinafter, referred to as □ pixel signal), as shown in FIGS. 4A to 4D.

Evaluation value={|(average value of 2Δ pixel signals)−(average value of four □ pixel signals)|}/(average value of total 6 pixel signals of two Δ pixel signals and four □ pixel signals)  (1)

One evaluation value corresponding to each of FIGS. 4A to 4D is calculated by the operation using equation (1).

The defective pixel correction unit 19 compares each of the four evaluation values obtained by the operation with a threshold value, determines that the edge portion is put on the area where the 25 pixels are arranged if at least one evaluation value exceeds the threshold value, and determines that the edge portion is not put on the area where the 25 pixels are arranged if at least one evaluation value does not exceed the threshold value.

Further, in the case where the correction target pixel is the Gb pixel, the evaluation value is obtained by the equation (1) by replacing "Gr" with "Gb" in FIGS. 4A to 4D, and the edge determination processing is thereby performed. The edge determination processing is not limited to the method described above, but well-known methods may be employed.

Next, the operation of the defective pixel correction unit 19 in the digital camera shown in FIG. 1 will be described.

Figure 5:
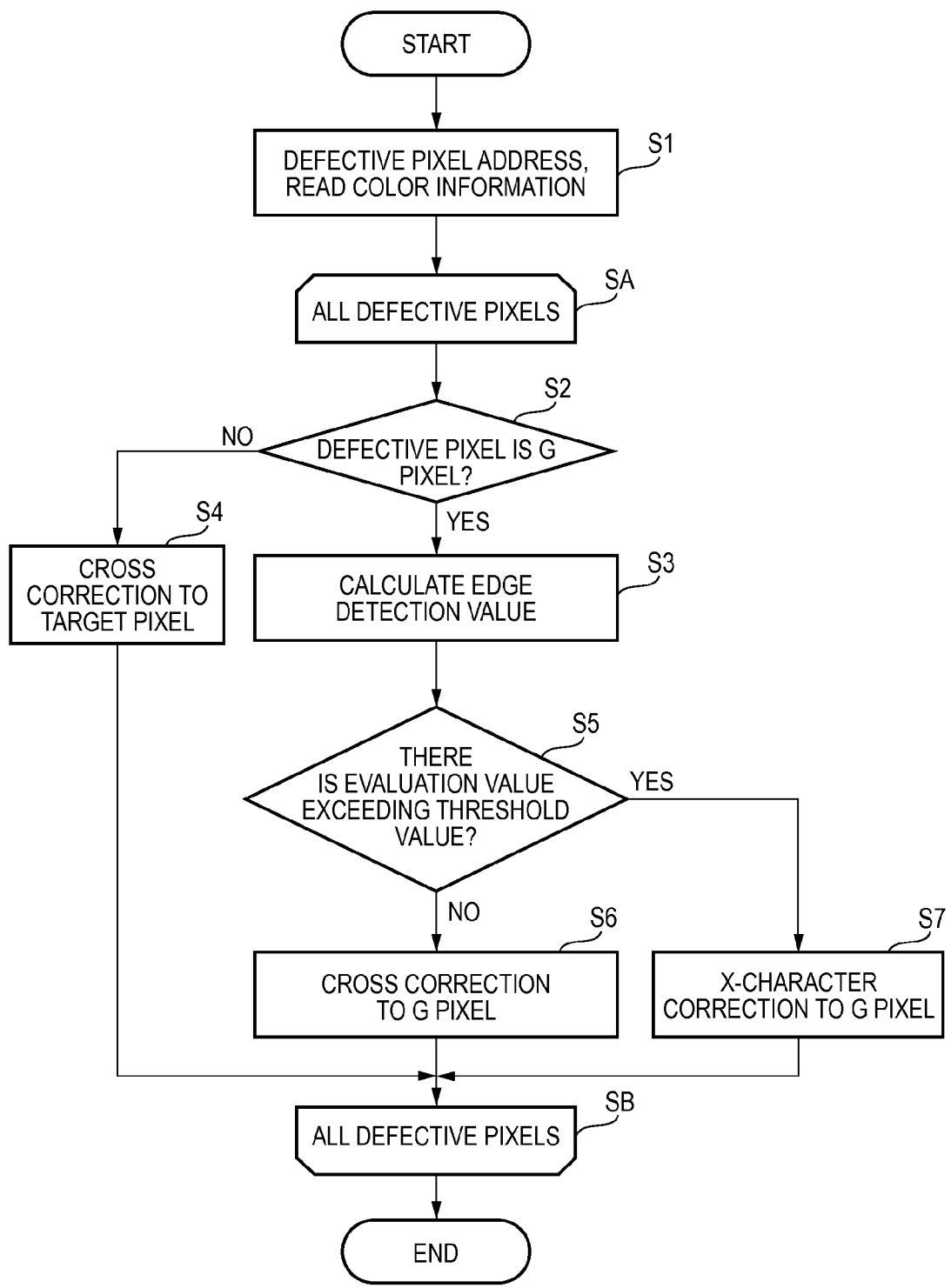
FIG. 5 is a flowchart illustrating an operation of the defective pixel correction unit 19 in the digital camera shown in FIG. 1.

FIG. 5 is a flowchart illustrating the operation of the defective pixel correction unit 19 in the digital camera shown in FIG. 1.

An imaging process is performed by the solid-state imaging element 5, and the captured image signal outputted from the solid-state imaging element in the imaging process is converted into a digital signal in the A/D converting circuit 7, and then, stored temporarily in the main memory 16.

While the captured image signal is stored in the main memory 16, the defective pixel correction processing flow starts by the defective pixel correction unit 19.

First, the defective pixel correction unit 19 reads, from the main memory 16, the information (information on detected color) indicating the type of the defective pixel and the address information of the defective pixel included in the solid-state imaging element 5 (step S1).

Next, the defective pixel correction unit 19 starts a processing loop for every defective pixel in step SA.

After start of the processing loop, the defective pixel correction unit 19 sets, as a correction target pixel, one defective pixel in accordance with the address information of the defective pixel, and determines whether the pixel set as a correction target pixel is a Gr pixel 54 or a Gb pixel 53 (step S2).

The defective pixel correction unit 19 performs the processing in step S3 when the pixel set as a correction target pixel is a Gr pixel 54 or Gb pixel 53 (step S2: YES), and performs the processing in step S4 when the pixel set as a correction target pixel is a R pixel 51 or B pixel 52 (step S2: NO).

In step S3, the defective pixel correction unit 19 calculates four evaluation values as described above according to the equation (1).

In step S4, the defective pixel correction unit 19 corrects an output signal of the correction target pixel using the output signals of the four pixels that are of the same type as the correction target pixel and that are adjacent to the correction target pixel in the cross direction, and proceeds to step SB after the step S4.

In step SB, the defective pixel correction unit 19 determines whether a defective pixel correction has been made with respect to all defective pixels, but if a defective pixel having not been corrected exists, it sets the defective pixel as a correction target pixel to return to the processing in step S2, and if a defective pixel having not been corrected does not exist, it ends the defective pixel correction processing flow.

After step S3, the defective pixel correction unit 19 compares the four evaluation values calculated in step S3 to the threshold value respectively step S3.

If no evaluation value exceeds the threshold value (step S5: NO), in this case, it may be determined that an edge portion of a subject is not put on a pixel positioned at the periphery of the correction target pixel (pixel at the periphery of the correction target pixel is overlapped with a low-frequency area of the subject). Accordingly, the defective pixel correction unit 19 performs the cross correction processing that is suitable for the low-frequency image (step S6).

When there is an evaluation value exceeding the threshold value (step S5: YES), in this case, it may be determined that an edge portion of a subject is put on the pixel positioned at the periphery of the correction target pixel (pixel at the periphery of the correction target pixel is overlapped with a high-frequency area of the subject). Accordingly, the defective pixel correction unit 19 performs the X character correction processing suitable for a high-frequency image (step S7).

As such, when the edge portion is overlapped with the pixels around the correction target pixel, since the output signal of the corresponding correction target pixel is corrected by the use of the output signals of the pixels of the same kind as the correction target pixel, which are at a position closer to the correction target pixel, the correction mark can be less conspicuous. In the area where the edge portion is overlapped, since the effect of level difference of the output signals of the Gb pixel and Gr pixel on the image quality is reduced, the X character correction processing is performed rather than the cross correction processing, thereby aiming at enhancement of image quality.

Further, when the edge portion is not overlapped with the pixels around the correction target pixel, since the output signal of the corresponding correction target pixel is corrected by the use of the output signals of the pixels of the same type and the same attribute as the correction target pixel, the correction mark can be inconspicuous. In the area where the edge portion is not overlapped, since the effect of level difference of the output signals of the Gr pixel and Gb pixel on the image quality is increased, the cross correction processing is performed rather than the X character correction processing, thereby aiming at enhancement of image quality.

As described above, in the case where the G pixel is a pixel to be corrected, the digital camera shown in FIG. 1 determines whether the edge portion of the subject is put on the pixels around the correction target pixel, when the edge portion is put thereon, it performs the X character correction processing, and when the edge portion is not put thereon, it performs the cross correction processing. As such, since it is possible to select and execute an optimal correction processing in accordance with the contents of the subject overlapped with the periphery area of the correction target pixel, it is possible to reduce the correction mark to a minimum after the defective pixel correction even with respect to a general subject in which a high-frequency area and a low-frequency area commonly exist and color mixing caused by ghost light source occurs, thereby improving image quality.

So far, it has been assumed that the 25 pixels centered on the correction target pixel do not include any defective pixel other than the corresponding correction target pixel. However, there may be even the case where any defective pixel other than the corresponding correction target pixel exists in the 25 pixels centered on the correction target pixel.

Therefore, in the first correction processing, it is preferred that the defective pixel correction unit 19 corrects an output signal of a corresponding correction target pixel using an output signal of a pixel other than a pixel subjected to a defective pixel correction among the pixels, which are adjacent to the correction target pixel, of the different attributes from, and at the same time, the same type as the corresponding correction target pixel.

Further, in the second correction processing (cross correction processing), it is preferable that the defective pixel correction unit 19 corrects an output signal of the correction target pixel by using the output signals of the pixels other than the pixel subject to a defective pixel correction, among the pixels which are adjacent to the correction target pixel, and of the same attributes, and at the same time, of the same type as the corresponding correction target pixel.

Figure 6:
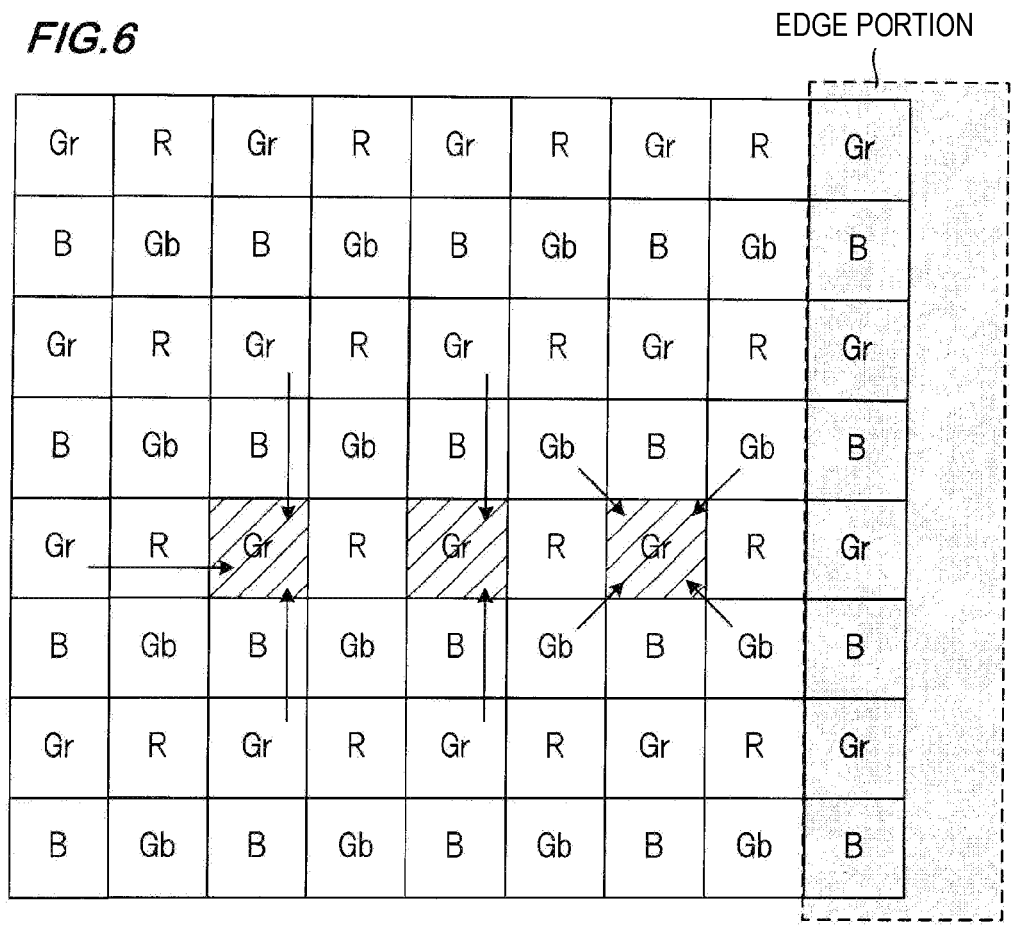
FIG. 6 is a view illustrating a modification of the operation of the defective pixel correction unit 19 in the digital camera shown in FIG. 1.

For example, as shown in FIG. 6, let's consider the case where the three hatched Gr-pixels, which are close to each other in the row direction (X), are defective pixels. In this case, when a defective pixel correction is performed to the Gr pixel of the left side out of the three Gr pixels, since the edge portion of the subject is not put on the 25 pixels centered on the corresponding left side Gr-pixels, the output signal of the corresponding Gr pixel at the left side is corrected by the cross correction processing. However, the Gr pixel positioned next to the corresponding left side Gr pixel in the right direction is a defective pixel. Therefore, the defective pixel correction unit 19 performs the defective pixel correction to the corresponding left side Gr pixel by replacing the average value of the output signals of the three Gr pixels, which are adjacent to the corresponding left side Gr pixel in the upper, left and lower directions thereof, with the output signal of the corresponding left side Gr pixel.

Further, when performing the defective pixel correction to the Gr pixel in the middle of the three Gr pixels shown in FIG. 6, since the edge portion of the subject is not put on any of the 25 pixels centered on the corresponding middle Gr pixel, the output signal of the corresponding middle Gr pixel is corrected by the cross correction processing. However, the Gr pixel adjacent to the corresponding middle Gr pixel in the right and left directions thereof is a defective pixel. Therefore, by replacing the average value of the output signals of the two Gr pixels which are adjacent to the corresponding middle Gr pixel in the upper and lower directions thereof with the output signal of the corresponding middle Gr pixel, the defective pixel correction unit 19 performs the defective pixel correction to the corresponding middle Gr-pixel.

Further, when performing the defective pixel correction to the Gr pixel at the right side of the three Gr-pixels shown in FIG. 6, since the edge portion of the subject is put on any of the 25 pixels centered on the corresponding right Gr-pixel, the output signal of the corresponding right Gr-pixel is corrected by the X-character correction processing. Since the four Gb-pixels adjacent to the corresponding right Gr-pixel in the X shaped direction do not include a defective pixel, the defective pixel correction unit 19 performs the defective pixel correction to the corresponding right Gr-pixel by replacing the average value of the output signals of the four Gb-pixels which are adjacent to the corresponding right Gr pixel in the X-shaped direction with the output signal of the corresponding right Gr pixel.

As such, when a defective pixel is included in the pixels of the output source of the signal used for correction of the output signal of the correction target pixel, the output signal of the correction target pixel is corrected by using the output signals of the pixels other than the defective pixel, thereby it is possible to reduce deterioration of image quality as much as possible after correction, even in the case where there are continuous scratches (defective pixels arranged continuously) in the solid-state imaging element 5, as shown in FIG. 6.

Hereinafter, when a defective pixel is included in the pixels of the output source of the signal used for correction of the output signal of the correction target pixel, the operation of the defective pixel correction unit 19 in the case where the output signal of the correction target pixel is corrected by using the output signals of the pixels other than the defective pixel will be described with reference to the accompanying drawings.

Figure 7:
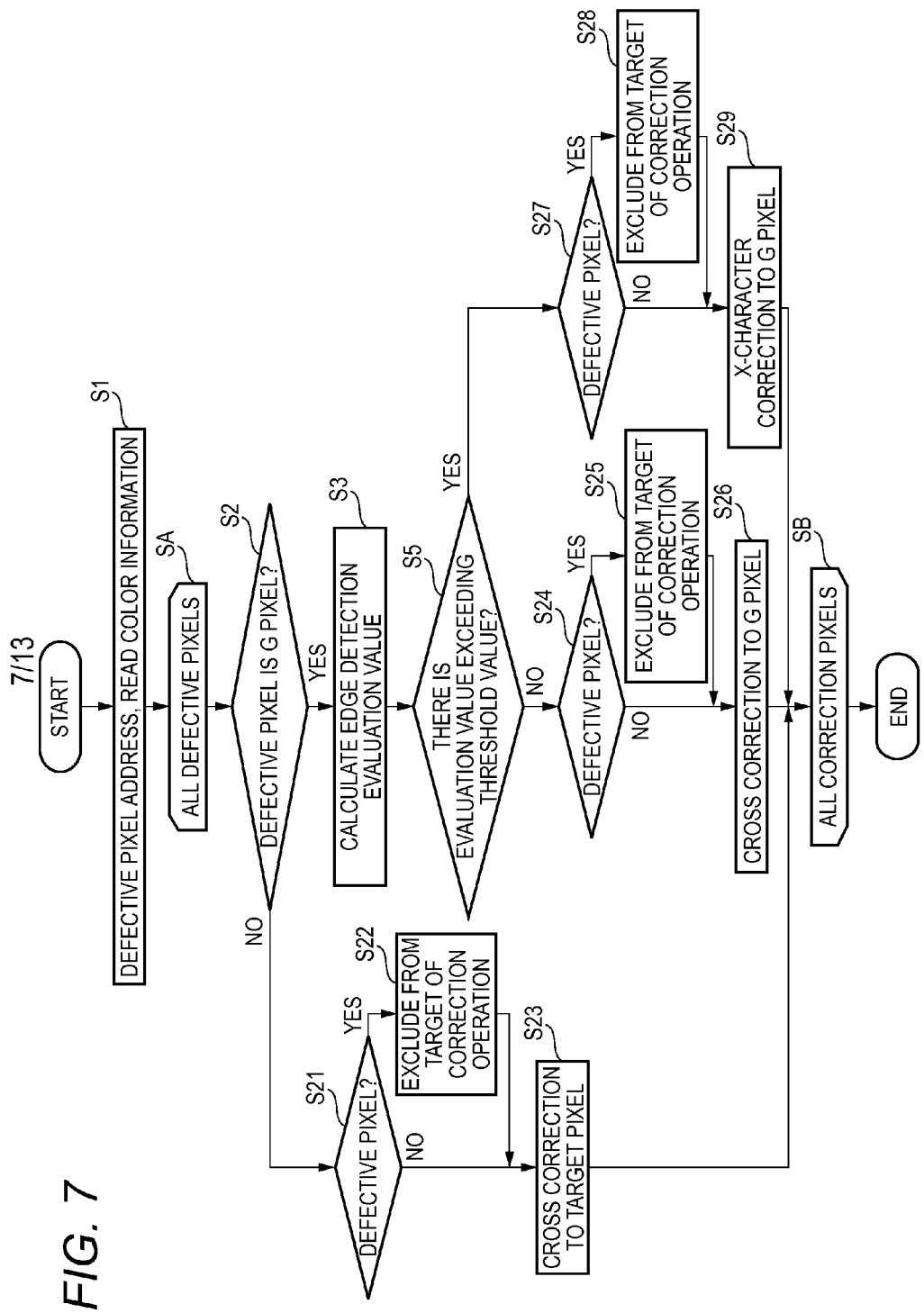
FIG. 7 is a flowchart illustrating a modification of the operation of the defective pixel correction unit 19 in the digital camera shown in FIG. 1.

FIG. 7 is a flowchart explaining a modification of the operation of the defective pixel correction unit 19 in the digital camera shown in FIG. 1. In FIG. 7, the same reference numerals are given to the same processing as the processing shown in FIG. 5 and descriptions thereof will be omitted.

After start of the processing loop in step SA, the defective pixel correction unit 19 sets one defective pixel as a correction target pixel according to the address information of the defective pixel, and determines whether the pixel set as a correction target pixel is the Gb pixel 53 or Gr pixel 54 (step S2).

In the case of S2: YES, the defective pixel correction unit 19 performs the processing in step S3 and step S5 in order, and in the case of step S2: NO, the defective pixel correction unit 19 performs the processing in step S21.

In step S21, the defective pixel correction unit 19 determines, based on the information read in step S1, whether a defective pixel is included in the four pixels of the same type as the correction target pixel, adjacent to the correction target pixel in the cross direction. If a defective pixel is included in the corresponding four pixels (step S21: YES), the defective pixel correction unit 19 excludes the defective pixel from the target of the correction operation (step S22). After the step S21: YES or S22, the defective pixel correction unit 19 performs the processing in step S23.

In step S23, the defective pixel correction unit 19 corrects an output signal of the corresponding correction target pixel by using an output signal of the pixel other than the pixel excluded from the target of the correction operation in step S22, among the four pixels of the same type as the correction target pixel, adjacent to the correction target pixel in the cross direction, thereafter proceeds to step SB.

In step SB, the defective pixel correction unit 19 determines whether a defective pixel correction has been made with respect to all defective pixels, then, if a defective pixel having not been corrected exists, it sets the defective pixel as a correction target pixel to return to the processing in step S2, and if a defective pixel having not been corrected does not exist, it ends the defective pixel correction processing flow.

In the case where the determination in step S5 is NO, the defective pixel correction unit 19 determines, based on the information read in step S1, whether a defective pixel is included in the four pixels of the same type, and at the same time, of the same attribute as the correction target pixel, adjacent to the corresponding correction target pixel in the cross direction (S24). If a defective pixel is included in the corresponding four pixels (step S24: YES), the defective pixel correction unit 19 excludes the defective pixel from the target of the correction operation (step S22). After the step S24: NO or S25, the defective pixel correction unit 19 performs the processing in step S26.

In step S26, the defective pixel correction unit 19 corrects an output signal of the corresponding correction target pixel by using an output signal of the pixel other than the pixel excluded from the target of the correction operation in step S25, among the four pixels of the same type, and at the same time, of the same attribute as the correction target pixel, adjacent to the correction target pixel in the cross direction, thereafter proceeds to step SB.

In the case where the determination in step S5 is YES, the defective pixel correction unit 19 determines, based on the information read in step S1, whether a defective pixel is included in the four pixels of the different attribute while being of the same type as the correction target pixel, adjacent to the corresponding correction target pixel in the cross direction (S27). If a defective pixel is included in the corresponding four pixels (step S27: YES), the defective pixel correction unit 19 excludes the defective pixel from the target of the correction operation (step S28). After the step S27: NO or S28, the defective pixel correction unit 19 performs the processing in step S29.

In step S29, the defective pixel correction unit 19 corrects an output signal of the corresponding correction target pixel by using an output signal of the pixel other than the pixel excluded from the target of the correction operation in step S28, among the four pixels of the different attribute while being of the same type as the correction target pixel, adjacent to the correction target pixel in the X-shaped direction, thereafter proceeding to step SB.

As described above, even in any of the cases where the defective pixel correction unit 19 performs the X character correction processing or the cross correction processing with respect to the G pixel, and it performs a correction to the R pixel (B pixel) using output signals of the four same-type pixels which are adjacent to the corresponding R pixel (B pixel) in the cross direction, when a defective pixel is included in the pixels of the output source of the output signal used in the correction to the output signal of the correction target pixel, the defective pixel correction unit 19 sets the pixel other than the defective pixel as a target of the correction operation, and corrects the output signal of the correction target pixel using the output signal of the pixel set as the target of the correction operation. Therefore, since the output signal of the defective pixel is used and the output signal of the correction target pixel is not corrected accordingly, it is possible to prevent deterioration of image quality after correction.

Figure 8:
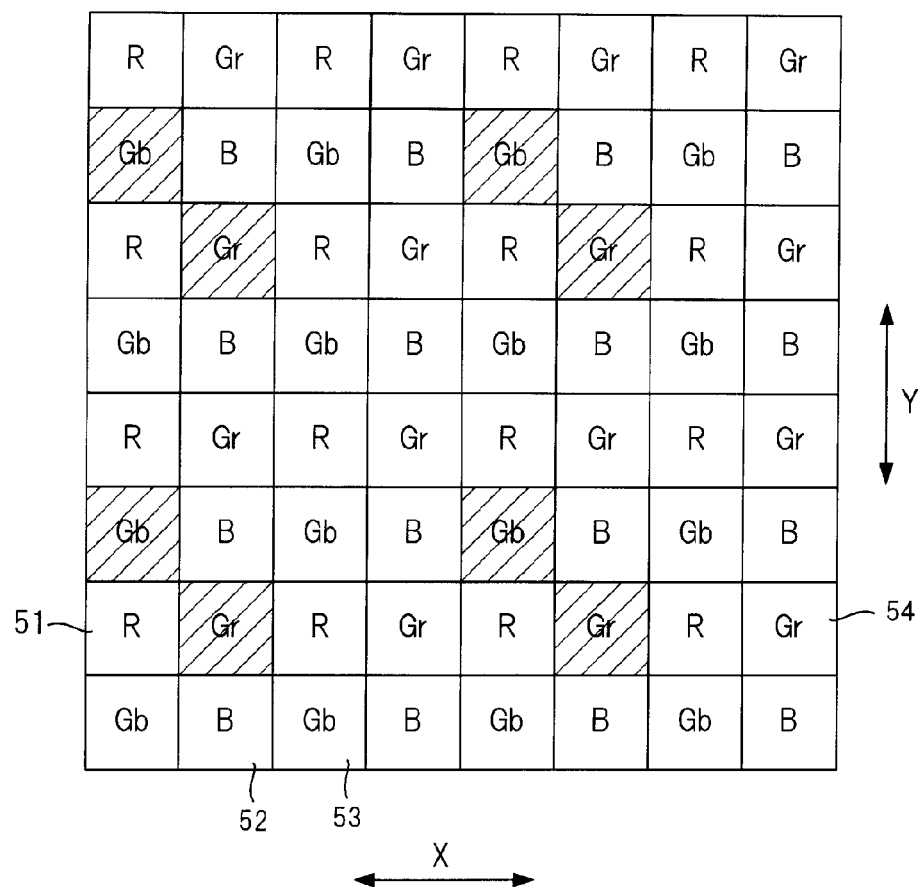
FIG. 8 is a schematic plan view showing a first modification of the solid-state imaging element 5 in the digital camera shown in FIG. 1.

FIG. 8 is a schematic plan view showing a first modification of the solid-state imaging element 5 in the digital camera shown in FIG. 1. In FIG. 8, same reference numerals are given to the same configuration as FIG. 2

The solid-state imaging element shown in FIG. 8 has the same configuration as in FIG. 2, except that a part of the Gb pixels 53 and the Gb pixels 54 disposed adjacent to the part of the Gb pixels 53 in the lower right direction function as pupil division pixels for receiving light passed through the different pupil areas of the photographing lens 1.

In FIG. 8, the diagonally hatched Gb pixels 53 and the Gr pixels 54 adjacent to the Gb pixels in the lower right direction form the pupil division pixels. The pupil division pixels can be realized by known configurations such as the configuration in which the optical apertures of each of the Gb pixel and the Gr pixel are eccentric in an opposite direction relative to each other, the configuration in which micro-lenses are shared in the pixel Gb and the pixel Gr, or the like.

The pupil division pixels are arranged in a plurality of sets sparsely over the entire surface of the solid-state imaging element 5. The system controller 11 calculates information on a phase difference using the captured image signals output from all of the Gb pixels 53 forming its pupil division pixels and the captured image signals output from all of the Gr pixels 54 forming its pupil division pixels, calculates the defocus amount based on the phase difference information, and controls the position of the focus lens included in the photographing lens 1 according to the defocus amount.

As shown in FIG. 8, in the case where the solid-state imaging element 5 is configured to include a pupil division pixel, as the address of the defective pixel to be stored in the main memory 16, it may store the address of all pixels constituting the pupil division pixels and information on the types of the pixels.

Pupil dividing pixels are commonplace for receiving the amount of light is extremely small, and to correct the defective pixel the pupil dividing pixel compared with the normal pixels otherwise. As mentioned above, that the pupil dividing pixel also stores the type information and the address in the main memory 16 as defective pixels, in addition to the defective pixel occurring on the manufacturing process, the pupil division that are intentionally formed also for the pixels, it is possible to accurately by preventing the image quality deterioration, a correction of the output signal FIG. 9 is a schematic plan view showing a second modification of the solid-state imaging element 5 in the digital camera shown in FIG. 1.

Figure 9:
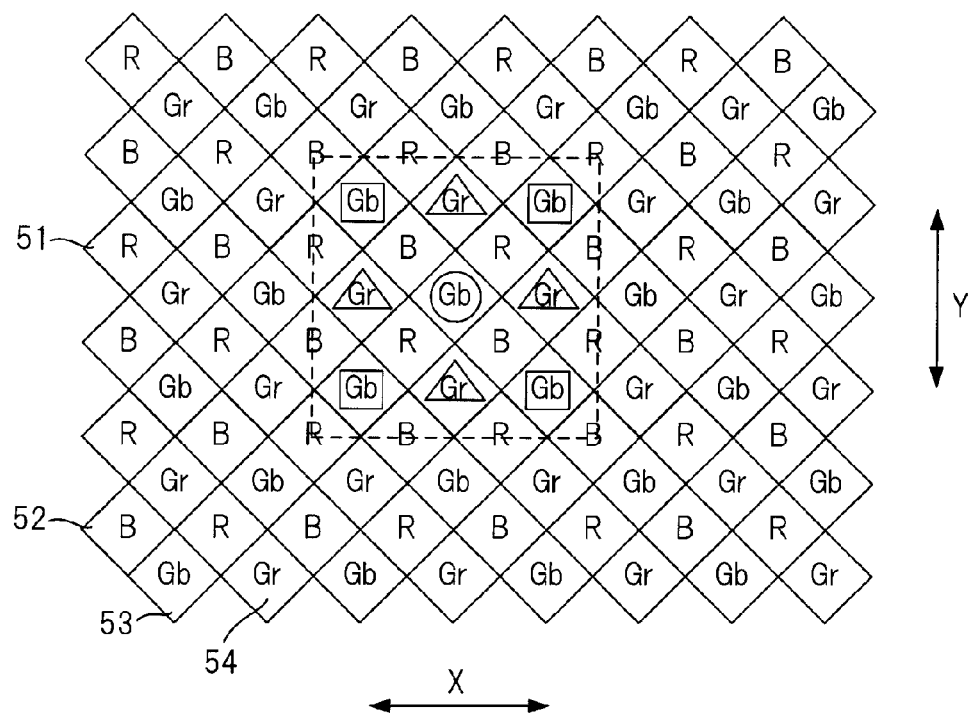
FIG. 9 is a schematic plan view showing a second modification of the solid-state imaging element 5 in the digital camera shown in FIG. 1.

The solid-state imaging element shown in FIG. 9 corresponds to that obtained by rotating through 45° the solid-state imaging element 5 shown in FIG. 2. The solid-state imaging element includes three types of pixels (R pixels, G pixels, B pixels), and is the same as the solid-state imaging element 5 shown in FIG. 2 in that the G pixels among the pixels of the three types are divided into the two types of attributes of pixels (Gr pixel, Gb pixel) around which the arrangement of the R pixels and B pixels is different from each other.

Even in the case where the solid-state imaging element 5 is modified to a solid-state imaging element shown in FIG. 9, the processing content of the defective pixel correction unit 19 is the same.

For example, if the Gb pixel surrounded by the mark ○ as shown in FIG. 9 is determined as a correction target pixel, the defective pixel correction unit 19 sets, as an edge determination area, the area surrounded by a broken line in FIG. 9 in which the Gb pixel and the pixels surrounding the Gb pixel are arranged, and determines whether an edge portion is put on the edge determination area.

Then, when it is determined that the edge portion is rested on the edge determination area, the defective pixel correction unit 19 corrects the output signal of the Gb pixel of a correction target by using the output signals of the Gr pixels (Gr pixels denoted the mark Δ in FIG. 9) of the different attribute while being of the same type as the corresponding Gb pixel, adjacent to the corresponding Gb pixel in the cross direction. Further, when it is determined that the edge portion is not rested on the edge determination area, the defective pixel correction unit 19 corrects the output signal of the Gb pixel of a correction target by using the output signals of the Gb pixels (Gb pixels denoted the mark □ in FIG. 9) of the same attribute while being of the same type as the corresponding Gb pixel, adjacent to the corresponding Gb pixel in the X-shaped direction.

As described above, even in the case of the solid-state imaging element having the pixel arrangement as shown in FIG. 9, when the edge portion is put on the edge determination area, the correction is performed using the pixels of the different attribute while being of the same type as the corresponding pixel, which are close to the correction target pixel in the distance. When the edge portion is not put on the edge determination area, the correction is performed using the pixels that are of the same attribute while being of the same type as the correction target pixel and having a small difference from the correction target pixel in the output level, thereby it is possible to minimize the degradation of the defective pixel after the defective pixel correction.

Figure 10:
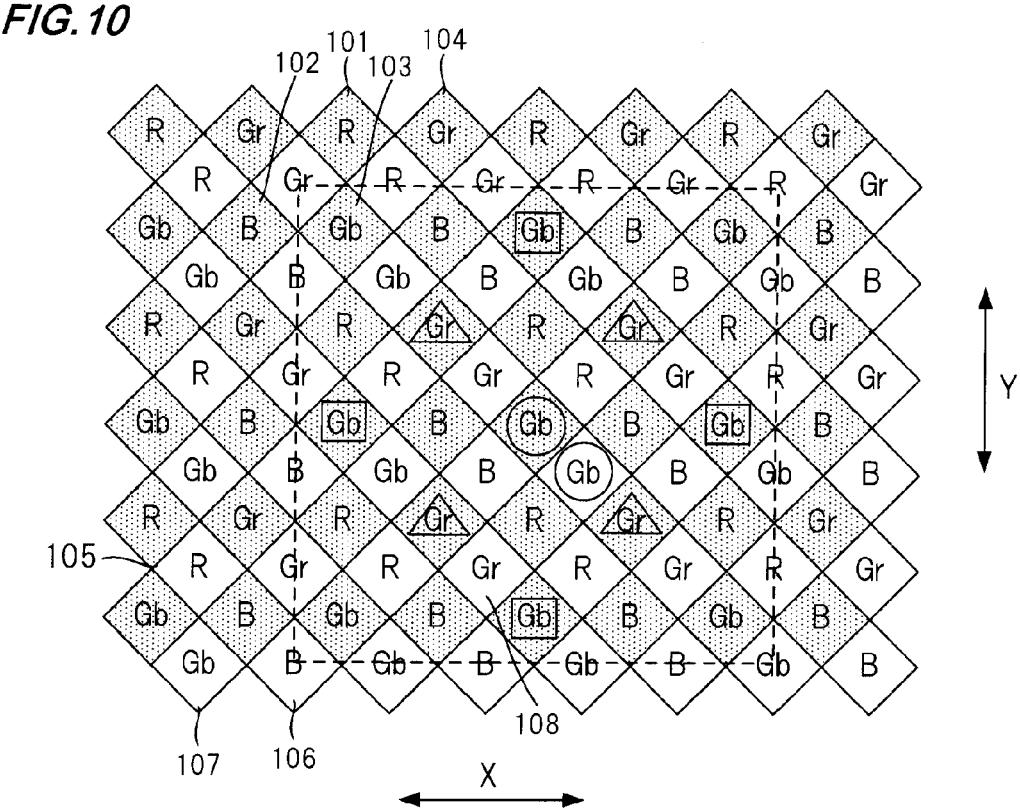
FIG. 10 is a schematic plan view showing a third modification of the solid-state imaging element 5 in the digital camera shown in FIG. 1.

FIG. 10 is a schematic plan view showing a third modification of the solid-state imaging element 5 in the digital camera shown in FIG. 1.

As shown in FIG. 10, the solid-state imaging element shown in FIG. 10 is provided with a first pixel group including a plurality of pixels 101, 102, 103, 104 which are hatched and arranged in a two-dimensional pattern (tetragonal lattice pattern in the example of FIG. 10) in the row direction X and the column direction Y perpendicular thereto and a second pixel group including a plurality of pixels 105, 106, 107, 108 which are arranged in the same sequence and the same number as the plurality of pixels included in the first pixel group.

In the solid-state imaging element, the first pixel group and the second pixel group are shifted by 45 degrees obliquely to each other so that one of the pixels included in the second pixel group is disposed adjacent to each of the pixels included in the first pixel group in the same direction (lower right direction in the example of FIG. 10).

The first pixel group and the second pixel group include three types of pixels, which are different from each other in the detected wavelength area, such as R pixels (marked with "R" in FIG. 10) detecting red light, B pixels (marked with "B" in FIG. 10) detecting green light, and G pixels (marked with "Gr, Gb" in FIG. 10) detecting green light, and the three types of pixels are arranged in a Bayer pattern.

In the first pixel group, the G pixels 103, 104 are arranged at a checkered position among the plurality of pixels arranged in a square grid arrangement, the R pixels 101 are arranged in the odd row at the other checkered position, and the pixels 102 are disposed in the even row.

The G pixels detecting green light, which is included in the first pixel group, are divided into two types of attributes of pixels (G pixel 103, G pixel 104) which are different from each other in the arrangement of the R pixel 101 and B pixel 102 which are adjacent to the corresponding G pixel and of the different type from the corresponding G pixel.

Hereinafter, the G pixel 103 on both sides of which the B pixels 102 are arranged is referred to as the Gb pixel 103, and the G pixel 104 on both sides of which the R pixels 101 are arranged is referred to as the Gr pixel 104. Since the Gb pixel 103 and the Gr pixel 104 are different from each other in the arrangement of the R pixel 101 and the B pixel 102 which are adjacent thereto, when light is incident obliquely on the solid-state imaging element, a level difference between the output signals the Gb pixel 103 and Gr pixel 104 is generated due to color mixing depending on the incident direction of the incident light.

As shown in FIG. 10, the G pixels detecting green light, which is included in the second pixel group, are divided into two types of attributes of pixels (G pixel 107, G pixel 108) which are different in the arrangement of the R pixel 105 and B pixel 106 which are adjacent to the corresponding G pixel and of the different type from the corresponding G pixel.

Hereinafter, the G pixel 107 on right and left sides of which the B pixels 106 are arranged is referred to as the Gb pixel 107, and the G pixel 108 on right and left sides of which the R pixels 105 are arranged is referred to as the Gr pixel 108. Since the Gb pixel 107 and the Gr pixel 108 are different in the arrangement of the R pixel 105 and the B pixel 106 which are adjacent thereto, when light is incident obliquely on the solid-state imaging element, a level difference between the output signals the Gb pixel 107 and Gr pixel 108 is generated due to color mixture depending on the incident direction of the incident light.

The solid-state imaging element is possible to read out a captured image signal independently of the first pixel group and the second pixel group, and to control the exposure time independently of the first pixel group and the second pixel group.

The digital camera in which the solid-state imaging element 5 has been changed to the solid-state imaging element shown in FIG. 10 is possible to set, as a still image shooting mode, three modes of high-resolution mode, high-sensitivity mode, and wide dynamic range mode.

In the high-resolution mode, the system controller 11 performs photographing with the same exposure time of each of the first pixel group and the second pixel group. Then, the digital signal processing unit 17 generates data of a high-resolution captured-image having the same pixel number as the number of at least all of the corresponding signals by using all signals obtained from the first pixel group and the second pixel group. The image data is compressed and then recorded on the recording medium 21.

In the high-sensitivity mode, the system controller 11 performs photographing with the same exposure time of each of the first pixel group and the second pixel group. Then, the digital signal processing unit 17 synthesizes the signals obtained from each pixel of the first pixel group and the signals obtained from the pixels of the second pixel group adjacent at the lower right side of each of the corresponding pixels, and generates image data of high sensitivity by using the signals after the synthesis. The captured image data is recorded on the recording medium 21 after being compressed.

In the wide dynamic range mode, the system controller 11 performs photographing in the state where the exposure time of the first pixel group is set shorter than the exposure time of the second pixel group. The digital signal processing unit 17 generates a short-exposure image data from the captured image signal obtained from the first pixel group and a long-exposure image data from the captured image signal from the captured image signal obtained from the second pixel group, and synthesizes the long-exposure image data and the short-exposure image data thereof to thereby generate image data with a wide dynamic range in which a dynamic range is expanded. The image data of the wide dynamic range is recorded on the recording medium 21 after being compressed.

The defective pixel correction unit 19 of the digital camera in which the solid-state imaging element 5 has been changed to the solid-state imaging element shown in FIG. 10 performs a defective pixel correction with respect to the first pixel group in the manner as shown in FIG. 5 or FIG. 6.

For example, in the case where the Gb pixel 103 marked with mark ○ as shown in FIG. 10 is a correction target pixel, the defective pixel correction unit 19 sets, as an edge determination area, the area where five rows×5 columns=25 pixels are arranged centered on the corresponding Gb pixel 103 in the first pixel group, and determines whether an edge portion of a subject is put on the edge determination area.

In the case where an edge portion is put on the edge determination area, the defective pixel correction unit 19 corrects the output signal of the Gb pixel 103 marked with mark ○ by using the output signals of the four Gr pixels 104 (Gr pixels denoted the mark Δ in FIG. 10) adjacent to the corresponding Gb pixel in the X character direction. In the case where the edge portion is not put on the edge determination area, the defective pixel correction unit 19 corrects the output signal of the Gb pixel 103 marked with mark ○ by using the output signals of the four Gb pixels (Gb pixels marked with the mark □ in FIG. 10) adjacent to the corresponding Gb pixel 103 in the cross direction.

After completing the defective pixel correction to the captured image signal output from the first pixel group, the defective pixel correction unit 19 corrects the signal obtained from the correction target pixel included in the second pixel group by using the output signals of the pixels of the first pixel group of the same type as the corresponding correction target pixel and adjacent to the corresponding correction target pixel.

For example, a case will be described where the Gb pixel 103 of the first pixel group marked with the mark ○ in FIG. 10 and the Gb pixel 107 of the second pixel group marked with the mark ○ are defective pixels. In this case, in the high-sensitivity mode or high-resolution mode, after completing the defective pixel correction to the first pixel group, the defective pixel correction unit 19 replaces an output signal of the Gb pixel 107 of the second pixel group marked with the mark ○ with the output signal of the Gr pixel 104 around which the arrangement of pixels in the second pixel group is the same as the arrangement of pixels in the first pixel group adjacent to the Gb pixel 107 of correction target pixel, among the pixels (Gb pixel 103 and Gr pixel 104) of the first pixel group of the same type and adjacent to the corresponding Gb pixel 107.

Further, in the wide dynamic range mode, after ending the defective pixel correction to the first pixel group, the defective pixel correction unit 19 obtains, from the system controller 11, information on the exposure time ratio (exposure time of the second pixel group/exposure time of the first pixel group) of the first pixel group and the second pixel group, and it replaces the output signal of the Gb pixel 107 of the second pixel group marked with the mark ○ with the value obtained by multiplying the output signal of the Gr pixel 104 adjacent to the corresponding Gb pixel 107 by the corresponding exposure time ratio.

Since the solid-state imaging element shown in FIG. 10 has the configuration in which the pixels of the second pixel group of the same type as each pixel of the first pixel group are arranged adjacent to each pixel of the first pixel group, the output signals of the same type pixels adjacent to each other in the first pixel group and the second pixel group have a close relationship. Therefore, for the first pixel group, the defective pixel correction is performed by the first correction processing or the second correction processing, depending on the result of the edge determination, and for the second pixel group, the correction to an output signal of a defective pixel is performed by using the captured image signal from the pixel group, thereby it is possible to reduce the time required for the defective pixel correction while maintaining the correction accuracy.

Further, the defective pixel correction unit 19 is possible to correct an output signal of the correction target pixel of the second pixel group by using output signals of the pixels which the arrangement of the second pixel group adjacent thereto is not the same as the arrangement of the pixels of the first pixel group adjacent to the corresponding correction target pixel, among the pixels which are of the same type as the corresponding correction target pixel and adjacent to the corresponding correction target pixel, or it is also possible to correct it using both output signals of the two pixels of the same type as the corresponding correction target pixel and adjacent to the corresponding correction target pixel.

As described above, in the case of correcting an output signal of correction target pixel in the second pixel group by using the output signals of the pixels which the arrangement of the pixels of the second pixel group adjacent thereto are the same as the arrangement of the pixels of the first pixel group adjacent to the corresponding correction target pixel, among the pixels of the same type as the corresponding correction target pixel and adjacent to the corresponding correction target pixel, there is an advantage of minimizing the deterioration of image quality after correction because the correction is performed by the replacement of pixels suffering a same effect by the color mixture due to the obliquely incident light.

Figure 11:
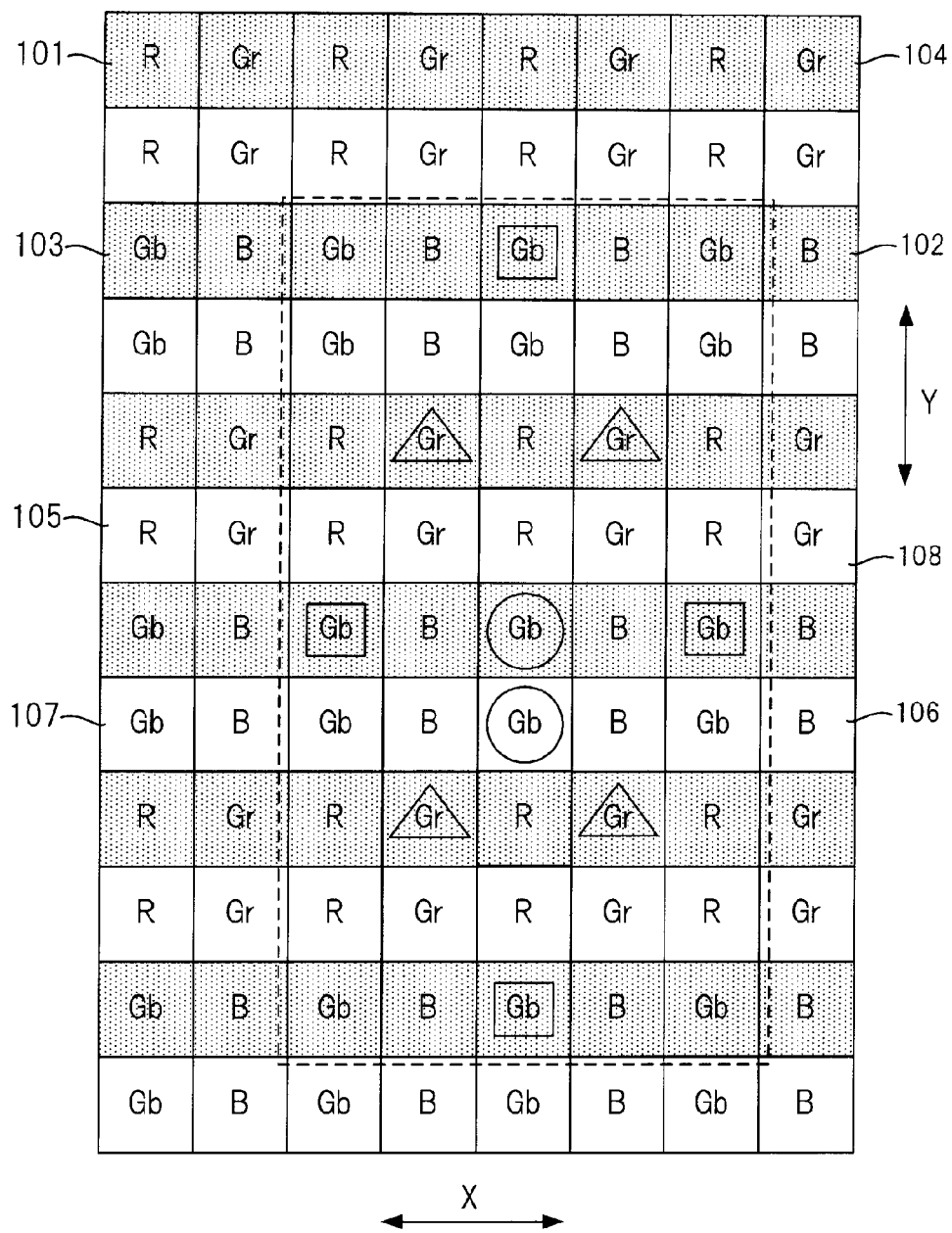
FIG. 11 is a schematic plan view showing a fourth modification of the solid-state imaging element 5 in the digital camera shown in FIG. 1.

FIG. 11 is a schematic plan view showing the fourth modification of the solid-state imaging element 5 in the digital camera shown in FIG. 1.

Except that the first pixel group and the second pixel group are arranged at odd angles from one another in the column direction Y, the solid-state imaging element shown in FIG. 11 has the same configuration as the solid-state imaging element shown in FIG. 10.

The digital camera in which the solid-state imaging element 5 has been changed to the solid-state imaging element shown in FIG. 11 is possible to set, as a still image shooting mode, three modes of high-resolution mode, high-sensitivity mode, and wide dynamic range mode, like the digital camera in which the solid-state imaging element 5 has been changed to the solid-state imaging element shown in FIG. 10.

Further, the defective pixel correction unit 19 of the digital camera, in which the solid-state imaging element 5 has been changed to the solid-state imaging element shown in FIG. 11, performs a correction to a defective pixel in the manner as shown in FIG. 1 or FIG. 6, like the digital camera in which the solid-state imaging element 5 has been changed to the solid-state imaging element shown in FIG. 10.

For example, in the case where the Gb pixel 103 in the first pixel group marked with mark ○ as shown in FIG. 11, the defective pixel correction unit 19 sets, as an edge determination area, the area where five rows×5 columns=25 pixels are arranged centered on the corresponding Gb pixel 103 in the first pixel group, and determines whether an edge portion of a subject is put on the edge determination area.

In the case where an edge portion is put on the edge determination area, the defective pixel correction unit 19 corrects the output signal of the Gb pixel 103 marked with mark ○ by using the output signals of the four Gr pixels 104 (Gr pixels denoted the mark Δ in FIG. 11) adjacent to the corresponding Gb pixel in the X character direction. In the case where the edge portion is not put on the edge determination area, the defective pixel correction unit 19 corrects the output signal of the Gb pixel 103 marked with mark ○ by using the output signals of the four Gb pixels (Gb pixels marked with the mark □ in FIG. 11) adjacent to the corresponding Gb pixel 103 in the cross direction.

After completing the defective pixel correction to the captured image signal output from the first pixel group, the defective pixel correction unit 19 corrects the signal obtained from the correction target pixel included in the second pixel group by using the output signals of the pixels of the first pixel group of the same type as the corresponding correction target pixel and adjacent to the corresponding correction target pixel.

For example, a case will be described where the Gb pixel 103 of the first pixel group marked with the mark ○ in FIG. 11 and the Gb pixel 107 of the second pixel group marked with the mark ○ are defective pixels.

In this case, in the high-sensitivity mode or high-resolution mode, after completing the defective pixel correction to the first pixel group, the defective pixel correction unit 19 replaces an output signal of the Gb pixel 107 of the second pixel group marked with the mark ○ with the output signal of the pixel (Gr pixel 103) of the first pixel group of the same type adjacent to the corresponding Gb pixel 107. Further, in the wide dynamic range mode, after ending the defective pixel correction to the first pixel group, the defective pixel correction unit 19 obtains, from the system controller 11, information on the exposure time ratio (exposure time of the second pixel group/exposure time of the first pixel group) of the first pixel group and the second pixel group, and it replaces the output signal of the Gb pixel 107 of the second pixel group marked with the mark ○ with the value obtained by multiplying the output signal of the Gb pixel 103 adjacent to the corresponding Gb pixel 107 by the corresponding exposure time ratio.

As such, even in the pixel arrangement shown in FIG. 11, the defective pixel correction can be performed at high speed while minimizing degradation of image quality.

Figure 12:
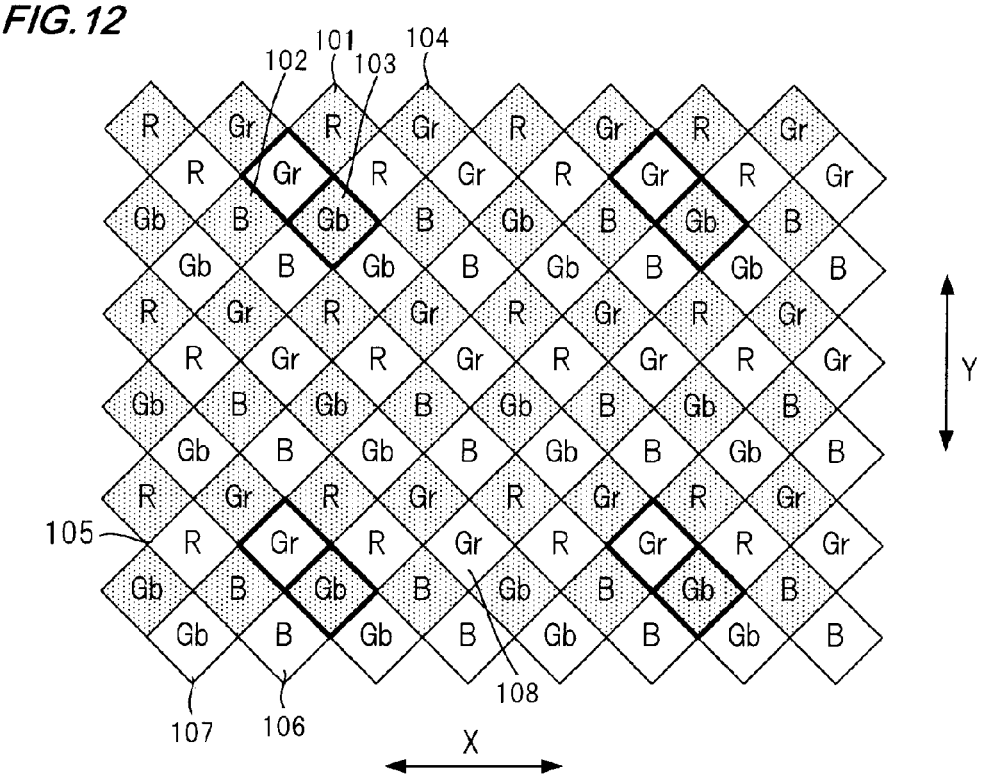
FIG. 12 is a schematic plan view showing a fifth modification of the solid-state imaging element 5 in the digital camera shown in FIG. 1.

FIG. 12 is a schematic plan view showing the fifth modification of the solid-state imaging element 5 in the digital camera shown in FIG. 1.

The solid-state imaging element shown in FIG. 12 has the same configuration as the solid-state imaging element shown in FIG. 10, except that a part (Gb pixel surrounded by bold line in FIG. 12) of the G pixels in the first pixel group and the G pixel (Gr pixel surrounded by bold line in FIG. 12) of the same type as the corresponding part of the pixels and adjacent to the corresponding part of the pixels in the upper left direction have been changed to pupil division pixels for receiving light passed through the different pupil areas of the photographing lens 1 mounted in the digital camera.

In the case where the solid-state imaging device shown in FIG. 12 is mounted in the digital camera shown in FIG. 1, the pupil division pixels are also treated as defective pixels. In this case, the address and information on its types are stored in the main memory 16; accordingly, an output signal correction can be performed at high speed with respect to the pupil division pixels that are intentionally formed, in addition to the defective pixels generated during a manufacturing process, while preventing deterioration of image quality.

Further, since many sets of the pupil division pixels are provided in the solid-state imaging element, the defective pixel correction for the first pixel group is performed to minimize deterioration of image quality in the manner described in FIGS. 5 and 6, and the defective pixel correction for the second pixel group is performed by a simple processing of high-speed priority using a captured image signal after the correction for the first pixel group, it is possible to improve the image quality and achieve a significant reduction of the time required for the defective pixel correction, in the solid-state image element having pupil division pixels Further, in the solid-state imaging element shown in FIG. 12, the pupil division pixel may be formed with a part of the Gb pixels in the first pixel group and the Gb pixels 107 in the second pixel group, which are adjacent to the corresponding part of the Gb pixels in the lower right direction.

However, in this case, the arrangement of the pixels of the second pixel group, which are adjacent to the pixels of the first pixel group, is different from the arrangement of the pixels of the first pixel group, which are adjacent to the pixels of the second pixel group that make up the pupil division pixels. Therefore, there is a possibility that the correlation of the output signals of the two pixels forming the pupil division pixels is reduced and the detection accuracy of the phase difference information is reduced.

As shown in FIG. 12, the pupil division pixels may be formed so that the arrangement of the pixels of the second pixel group which are adjacent to the pixels of the first pixel group, is the same as the arrangement of the pixels of the first pixel group which are adjacent to the pixels of the second pixel group that make up the pupil division pixels. Thereby, it is possible to increase the correlation of the output signals of the two pixels forming the pupil division pixels and improve the detection accuracy of the phase difference information.

In the above description, it is assumed that the solid-state imaging element has the three types of pixels which are different from each other in the detection wavelength range, but it may have four or more types of pixels which are different from each other in the detection wavelength range. Also, the detection wavelength range has been assumed to be in the range of primary color light, but it may be in the range of complementary color light.

As described above, the followings are disclosed herein.

An imaging device as disclosed includes a solid-state imaging element for color imaging that has at least a first pixel group including at least three types of pixels that are two-dimensionally arranged and different from each other in a detection wavelength range; and a defective pixel correction unit that performs a defective pixel correction to a captured image signal output from the solid-state imaging element. One type of pixels out of the at least three types of pixels is divided into two kinds of attributes of pixels around which arrangements of pixels that are arranged at the periphery of the corresponding pixels and that are of different type from the corresponding pixels are different from each other. In the case where a correction target pixel is any one of the two kinds of attributes of pixels, the defective pixel correction unit determines whether an edge portion of a subject is put on the pixels of the first pixel group adjacent to the correction target pixel; when it is determined that the edge portion is put on the pixels, it performs a first correction processing; and when it is determined that the edge portion is not put on the pixels, it performs a second correction processing. The first correction processing is a processing for correcting an output signal of the corresponding correction target pixel using output signals of the pixels in the first pixel group, which are of the different attribute while being of the same type as the corresponding correction target pixel and adjacent to the correction target pixel. The second correction processing is a processing for correcting an output signal of the corresponding correction target pixel using output signals of the pixels in the first pixel group, which are of the same attribute while being of the same type as the corresponding correction target pixel and adjacent to the correction target pixel.

In the imaging device as disclosed, the solid-state imaging element further includes a second pixel group including the at least three types of pixels that are two-dimensionally arranged, and the pixels included in the second pixel group which are of the same type as each of the corresponding pixels are arranged adjacent to each of the corresponding pixels included in the first pixel group in the same direction. After completion of the defective pixel correction to the captured image signal output from the first pixel group, the defective pixel correction unit corrects an output signal of the correction target pixel included in the second pixel group using output signals of pixels included in the first pixel group of the same type as the correction target pixel and adjacent to the corresponding correction target pixel.

In the imaging device as disclosed, the solid-state imaging element includes a pupil division pixel for receiving light passing through different pupil areas of a photographing lens mounted in the imaging device, wherein the pupil division pixel is formed with a part of the first type of pixels in the first pixel group and the pixels of the second pixel group which are of the same type as the corresponding part of the pixels and adjacent to the corresponding part of the pixels. The defective pixel correction unit sets even the pupil division pixel as a correction target pixel.

The imaging device, as disclosed, includes an imaging control unit that allows the solid-state imaging element to perform imaging in which the exposure time of the first pixel group is shorter than the exposure time of the second pixel group, and an image processing unit that generates a synthesized image data obtained by synthesizing image data based on a captured image signal that is obtained from the first pixel group by performing the imaging and corrected by the defective pixel correction unit, and image data based on a captured image signal that is obtained from the second pixel group by the imaging and corrected by the defective pixel correction unit.

In the imaging device as disclosed, after ending the defective pixel correction for the captured image signal output from the first pixel group, when the defective pixel correction unit corrects an signal obtained from the correction target pixel included in the second pixel group by using output signals of the pixels of the first pixel group of the same type of the corresponding correction target pixel and adjacent to the corresponding correction target pixel, in the case where there are two pixels of the first pixel group of the same type as the corresponding correction target pixel and adjacent to the corresponding target pixel, it performs the correction using the output signals of the pixels which the arrangement of the pixels of the second pixel group, adjacent to the correction target pixel, among the corresponding two pixels, is the same as the arrangement of pixels of the first pixel group adjacent to the corresponding correction target pixel.

In the imaging device as disclosed, in the first correction processing, the defective pixel correction unit corrects the output signal of the correction target pixel by using output signals of pixels other than the pixels subject to correction by the defective pixel correction unit, among the pixels of different attribute from the correction target pixel while being of the same type as the correction target pixel and close to the correction target pixel; in the second correction processing, it corrects the output signal of the corresponding correction target pixel by using the output signals of pixels other than the pixels subject to correction by the defective pixel correction unit, among the pixels of the same attribute as the correction target pixel while being of the same type as the correction target pixel and close to the correction target pixel.

In the imaging device, the at least three types of pixels include pixels for detecting red light, pixels for detecting green light and pixels for detecting blue light, and the pixels for detecting green light are divided into two kinds of attributes of pixels.

In the imaging device, the pixels for detecting red light, pixels for detecting green light and pixels for detecting blue light are arranged in Bayer pattern.

As a defective pixel correction method as disclosed herein, the defective pixel correction method of performing a defective pixel correction to a captured image signal output from a solid-state imaging element for color imaging that has at least a first pixel group including at least three types of pixels that are two-dimensionally arranged and different from each other in a detection wavelength range, wherein one type of pixels out of the at least three types of pixels is divided into two kinds of attributes of pixels around which arrangements of pixels that are arranged at the periphery of the corresponding pixels and different its type from the corresponding pixels are different from each other, the method includes an edge determination step of determining whether or not an edge portion of a subject is put on the pixels of the first pixel group adjacent to the correction target pixel when a correction target pixel is any one of the two kinds of attributes of pixels; and a correction processing step of performing a first correction processing when it is determined that the edge portion is put on the pixels, and performing a second correction processing when it is determined that the edge portion is not put on the pixels, wherein the first correction processing is a processing for correcting an output signal of the corresponding correction target pixel using output signals of the pixels in the first pixel group, which are of the different attribute while being of the same type as the corresponding correction target pixel and adjacent to the correction target pixel, and the second correction processing is a processing for correcting an output signal of the corresponding correction target pixel by using output signals of the pixels in the first pixel group, which are of the same attribute while being of the same type as the corresponding correction target pixel and adjacent to the correction target pixel.

In the defective pixel correction method, the solid-state imaging element further includes a second pixel group including the at least three types of pixels that are two-dimensionally arranged, the pixels included in the second pixel group which are of the same type as each of the corresponding pixels are arranged adjacent to the each of the corresponding pixels included in the first pixel group in the same direction, the method includes a first defective pixel correction step of performing a defective pixel correction with respective to a captured image signal output from the first pixel group, and a second defective correction step of performing a defective pixel correction a captured image signal output from the second pixel group after ending the first defective pixel correction, wherein the first defective pixel correction step includes the edge determination step and the correction processing step, and the second defective pixel correction step includes correcting an output signal of the correction target pixel included in the second pixel group by using output signals of pixels included in the first pixel group of the same type as the corresponding correction target pixel and adjacent to the corresponding correction target pixel.

In the defective pixel correction method as disclosed, the solid-state imaging element includes a pupil division pixel for receiving light passing through a different pupil areas of a photographing lens mounted in the imaging device, wherein the pupil division pixel is formed with a part of the first type of pixels in the first pixel group and the pixels of the second pixel group which are of the same type as the corresponding part of the pixels and adjacent to the corresponding part of the pixels, and in the first defective pixel correction step and the second defective pixel correction step, even the pupil division pixel is set as a correction target pixel.

In the defective pixel correction method as disclosed, when correcting an signal obtained from the correction target pixel included in the second pixel group by using output signals of the pixels of the first pixel group of the same type of the corresponding correction target pixel and adjacent to the corresponding correction target pixel, in the case where there are two pixels of the first pixel group of the same type as the corresponding correction target pixel and adjacent to the corresponding target pixel, the second defective pixel correction step includes performing the correction using the output signals of the pixels which the arrangement of the adjacent pixels of the second pixel group, among the corresponding two pixels, is the same as the arrangement of the pixels of the first pixel group adjacent to the corresponding correction target pixel.

In the defective pixel correction method as disclosed, the correction processing step includes, in the first correction processing, correcting the output signal of the corresponding correction target pixel by using output signals of pixels other than the pixels subject to the defective pixel correction, among the pixels of different attribute from the correction target pixel while being of the same type as the corresponding correction target pixel and close to the correction target pixel; and in the second correction processing, correcting the output signal of the corresponding correction target pixel by using the output signals of pixels other than the pixels subject to the defective pixel correction, among the pixels of the same attribute as the correction target pixel while being of the same type as the corresponding correction target pixel and close to the correction target pixel.

In the defective pixel correction method as disclosed, the at least three types of pixels include pixels for detecting red light, pixels for detecting green light and pixels for detecting blue light, and the pixels for detecting green light are divided into two kinds of attributes of pixels.

In the defective pixel correction method as disclosed, the pixels for detecting red light, pixels for detecting green light and pixels for detecting blue light are arranged in Bayer pattern.

According to the present invention, it is possible to provide an imaging device and a defective pixel correction method capable of improving the accuracy of a defective pixel correction.

The present invention has been described in detail and with reference to specific embodiments thereof. But, it will be appreciated by those skilled in the art that changes may be made in these embodiments without departing from the principles and spirit of the invention.

What is claimed is:

1. An imaging device, comprising:
   a solid-state imaging element for color imaging that has at least a first pixel group including at least three types of pixels that are two-dimensionally arranged and different from each other in a detection wavelength range; and
   a system controller configured to perform a defective pixel correction to a captured image signal output from the solid-state imaging element,
   wherein one type of pixels out of the at least three types of pixels is divided into two kinds of attributes of pixels around which arrangements of pixels that are arranged at the periphery of the corresponding pixels and different in its type from the corresponding pixels are different from each other,
   wherein in a case where a correction target pixel is any one of the two kinds of attributes of pixels, the system controller determines whether an edge portion of a subject is put on a pixel area which is centered on the correction target pixel and includes pixels of the same attribute and the same type as the correction target pixel, when it is determined that the edge portion is put on the pixels, it performs a first correction processing, and when it is determined that the edge portion is not put on the pixels, it performs a second correction processing,
   wherein the first correction processing is a processing for correcting an output signal of the corresponding correction target pixel using output signals of the pixels in the first pixel group, which are of the different attribute while being of the same type as the corresponding correction target pixel and adjacent to the correction target pixel, and
   wherein the second correction processing is a processing for correcting an output signal of the corresponding correction target pixel using output signals of the pixels in the first pixel group, which are of the same attribute while being of the same type as the corresponding correction target pixel and adjacent to the correction target pixel.

2. The imaging device as claimed in claim 1,
   wherein the solid-state imaging element further comprises a second pixel group comprising the at least three types of pixels that are two-dimensionally arranged, and pixels included in the second pixel group which are of the same type as each of the corresponding pixels are arranged adjacent to each of the corresponding pixels included in the first pixel group in a same direction, and
   wherein after ending a defective pixel correction to a captured image signal output from the first pixel group, the system controller corrects an output signal of a correction target pixel included in the second pixel group by using output signals of pixels included in the first pixel group of the same type as the correction target pixel and adjacent to the corresponding correction target pixel.

3. The imaging device as claimed in claim 2, wherein the solid-state imaging element comprises pupil division pixels for receiving light passing through different pupil areas of a photographing lens mounted in the imaging device, wherein the pupil division pixels are formed with a part of the first type of pixels in the first pixel group and pixels of the second pixel group which are of the same type as the corresponding part of the pixels and adjacent to the corresponding part of the pixels, and the system controller sets even the pupil division pixel as a correction target pixel.

4. The imaging device as claimed in claim 2, wherein the system controller allows the solid-state imaging element to perform imaging in which an exposure time of the first pixel group is shorter than an exposure time of the second pixel group, and system controller generates a synthesized image data obtained by synthesizing image data based on a captured image signal that is obtained from the first pixel group by performing the imaging and corrected by the system controller, and image data based on a captured image signal that is obtained from the second pixel group by the imaging and corrected by the system controller.

5. The imaging device as claimed in claim 2, wherein, after ending a defective pixel correction for a captured image signal output from the first pixel group, when correcting an signal obtained from a correction target pixel included in the second pixel group by using output signals of pixels of the first pixel group of the same type of the corresponding correction target pixel and adjacent to the corresponding correction target pixel, in a case where there are two pixels of the first pixel group of the same type as the corresponding correction target pixel and adjacent to the corresponding target pixel, the system controller performs the correction using the output signals of the pixels which an arrangement of pixels of the second pixel group, adjacent to the correction target pixel, among the corresponding two pixels, is the same as an arrangement of pixels of the first pixel group adjacent to the corresponding correction target pixel.

6. The imaging device as claimed in claim 1, wherein in the first correction processing, the system controller corrects an output signal of a corresponding correction target pixel by using output signals of pixels other than the pixels subject to correction by the system controller, among the pixels of different attribute from the correction target pixel while being of the same type as the corresponding correction target pixel and close to the correction target pixel; in the second correction processing, it corrects the output signal of the corresponding correction target pixel by using the output signals of pixels other than the pixels subject to correction by the system controller, among the pixels of the same attribute as the correction target pixel while being of the same type as the correction target pixel and close to the correction target pixel.

7. The imaging device as claimed in claim 1, wherein the at least three types of pixels comprises pixels for detecting red light, pixels for detecting green light and pixels for detecting blue light, and the pixels for detecting green light are divided into two kinds of attributes of pixels.

8. The imaging device as claimed in claim 7, wherein the pixels for detecting red light, pixels for detecting green light and pixels for detecting blue light are arranged in a Bayer pattern.

9. A defective pixel correction method of performing a defective pixel correction to a captured image signal output from a solid-state imaging element for color imaging that comprises at least a first pixel group comprising at least three types of pixels that are two-dimensionally arranged and different from each other in a detection wavelength range, wherein one type of pixels out of the at least three types of pixels is divided into two kinds of attributes of pixels around which arrangements of pixels that are arranged at the periphery of the corresponding pixels and different its type from the corresponding pixels are different from each other, the method comprises:

an edge determination step of determining whether or not an edge portion of a subject is put on pixels of the first pixel group adjacent to a correction target pixel when the correction target pixel is any one of the two kinds of attributes of pixels; and a correction processing step of performing a first correction processing when it is determined that the edge portion is put on the pixels, and performing a second correction processing when it is determined that the edge portion is not put on the pixels, wherein the first correction processing is a processing for correcting an output signal of a corresponding correction target pixel using output signals of the pixels in the first pixel group, which are of the different attribute while being of the same type as the corresponding correction target pixel and adjacent to the correction target pixel, and wherein the second correction processing is a processing for correcting an output signal of a corresponding correction target pixel by using output signals of the pixels in the first pixel group, which are of the same attribute while being of the same type as the corresponding correction target pixel and adjacent to the correction target pixel.

10. The defective pixel correction method as claimed in claim 9, wherein the solid-state imaging element further comprises a second pixel group including the at least three types of pixels that are two-dimensionally arranged, the pixels included in the second pixel group which are of the same type as each of the corresponding pixels are arranged adjacent to the each of the corresponding pixels included in the first pixel group in the same direction, wherein the method comprises:
first defective pixel correction step of performing a defective pixel correction with respective to a captured image signal output from the first pixel group; and a second defective correction step of performing a defective pixel correction a captured image signal output from the second pixel group after ending the first defective pixel correction, wherein the first defective pixel correction step comprises the edge determination step and the correction processing step, and the second defective pixel correction step comprises correcting an output signal of the correction target pixel included in the second pixel group by using output signals of pixels included in the first pixel group of the same type as the corresponding correction target pixel and adjacent to the corresponding correction target pixel.

11. The defective pixel correction method as claimed in claim 10, wherein the solid-state imaging element comprises a pupil division pixel for receiving light passing through a different pupil areas of a photographing lens mounted in the imaging device, wherein the pupil division pixel is formed with a part of the first type of pixels in the first pixel group and pixels of the second pixel group which are of the same type as the corresponding part of the pixels and adjacent to the corresponding part of the pixels, and wherein in the first defective pixel correction step and the second defective pixel correction step, even the pupil division pixel is set as a correction target pixel.

12. The defective pixel correction method as claimed in claim 10, wherein, when correcting an signal obtained from a correction target pixel included in the second pixel group by using output signals of pixels of the first pixel group of the same type of the corresponding correction target pixel and adjacent to the corresponding correction target pixel, in the case where there are two pixels of the first pixel group of the same type as the corresponding correction target pixel and adjacent to the corresponding target pixel, the second defective pixel correction step comprises performing the correction using the output signals of the pixels which an arrangement of the adjacent pixels of the second pixel group, among the corresponding two pixels, is the same as an arrangement of pixels of the first pixel group adjacent to the corresponding correction target pixel.

13. The defective pixel correction method as claimed in claim 9, wherein, the correction processing step comprises, in the first correction processing, correcting an output signal of a corresponding correction target pixel by using output signals of pixels other than the pixels subject to the defective pixel correction, among the pixels of different attribute while being of the same type as the corresponding correction target pixel and close to the correction target pixel; and in the second correction processing, correcting an output signal of a corresponding correction target pixel by using output signals of pixels other than the pixels subject to the defective pixel correction, among the pixels of the same attribute as a corresponding correction target pixel while being of the same type as the corresponding correction target pixel and close to the correction target pixel.

14. The defective pixel correction method as claimed in claim 9, wherein the at least three types of pixels comprises pixels for detecting red light, pixels for detecting green light and pixels for detecting blue light, and the pixels for detecting green light are divided into the two kinds of attributes of pixels.

15. The defective pixel correction method as claimed in claim 14, wherein the pixels for detecting red light, pixels for detecting green light and pixels for detecting blue light are arranged in a Bayer pattern.

16. An imaging device, comprising:
a solid-state imaging element for color imaging that has at least a first pixel group including at least three types of pixels that are two-dimensionally arranged and different from each other in a detection wavelength range; and
a system controller that performs a defective pixel correction to a captured image signal output from the solid-state imaging element,
wherein one type of pixels out of the at least three types of pixels is divided into two kinds of attributes of pixels around which arrangements of pixels that are arranged at the periphery of the corresponding pixels and different in its type from the corresponding pixels are different from each other, wherein in a case where a correction target pixel is any one of the two kinds of attributes of pixels, the system controller determines whether an edge portion of a subject is put on a pixel area which is centered on the correction target pixel and includes pixels of the same attribute and the same type as the correction target pixel, when it is determined that the edge portion is put on the pixels, it performs a first correction processing, and when it is determined that the edge portion is not put on the pixels, it performs a second correction processing, wherein the first correction processing is a processing for correcting an output signal of the corresponding correction target pixel using output signals of the pixels in the first pixel group, which are of the different attribute while being of the same type as the corresponding correction target pixel and adjacent nearest to the correction target pixel, and wherein the second correction processing is a processing for correcting an output signal of the corresponding correction target pixel using output signals of the pixels in the first pixel group, which are of the same attribute while being of the same type as the corresponding correction target pixel and adjacent to the correction target pixel.

17. A defective pixel correction method of performing a defective pixel correction to a captured image signal output from a solid-state imaging element for color imaging that comprises at least a first pixel group comprising at least three types of pixels that are two-dimensionally arranged and different from each other in a detection wavelength range, wherein one type of pixels out of the at least three types of pixels is divided into two kinds of attributes of pixels around which arrangements of pixels that are arranged at the periphery of the corresponding pixels and different its type from the corresponding pixels are different from each other, the method comprises:

an edge determination step of determining whether or not an edge portion of a subject is put on pixels of the first pixel group adjacent to a correction target pixel when the correction target pixel is any one of the two kinds of attributes of pixels; and a correction processing step of performing a first correction processing when it is determined that the edge portion is put on the pixels, and performing a second correction processing when it is determined that the edge portion is not put on the pixels, wherein the first correction processing is a processing for correcting an output signal of a corresponding correction target pixel using output signals of the pixels in the first pixel group, which are of the different attribute while being of the same type as the corresponding correction target pixel and adjacent nearest to the correction target pixel, and wherein the second correction processing is a processing for correcting an output signal of a corresponding correction target pixel by using output signals of the pixels in the first pixel group, which are of the same attribute while being of the same type as the corresponding correction target pixel and adjacent to the correction target pixel.

* * * * *